United States Patent

Matsubara et al.

[11] Patent Number: 5,210,132
[45] Date of Patent: May 11, 1993

[54] CONTINUOUS PROCESS FOR PREPARING RUBBER MODIFIED HIGH IMPACT RESIN

[75] Inventors: Tetsuyuki Matsubara, Yokohama; Norifumi Ito, Kamakura; Mune Iwamoto, Takaishi; Kazuo Sugazaki, Yokohama; Toshihiko Ando, Takaishi; Yasuo Furuta, Hiratsuka; Kouzo Ichikawa, Takaishi; Hitoshi Ozawa, Tokyo, all of Japan

[73] Assignee: Mitsui Toatsu Chemicals, Inc., Tokyo, Japan

[21] Appl. No.: 961,026

[22] Filed: Oct. 14, 1992

Related U.S. Application Data

[63] Continuation of Ser. No. 455,132, Dec. 22, 1989, abandoned.

[30] Foreign Application Priority Data

Dec. 28, 1988 [JP] Japan .............................. 63-334651
Dec. 28, 1988 [JP] Japan .............................. 63-334652
Jun. 27, 1989 [JP] Japan .............................. 1-162691
Jun. 27, 1989 [JP] Japan .............................. 1-162692

[51] Int. Cl.$^5$ .......................................... C08F 279/04
[52] U.S. Cl. ..................................... 525/53; 525/313; 525/316
[58] Field of Search .................... 525/53, 316, 313

[56] References Cited

U.S. PATENT DOCUMENTS 4,198,383 4/1980 Konsetov et al. .
4,388,447 6/1983 Iwamoto .
4,587,294 5/1986 Matsubara .

FOREIGN PATENT DOCUMENTS 49-35354 9/1974 Japan .
49-35355 9/1974 Japan .
52-29793 8/1977 Japan .
53-7794 1/1978 Japan .
59-17725 4/1984 Japan .
1175262 12/1969 United Kingdom .
2088884 6/1982 United Kingdom .

Primary Examiner—James J. Seidleck
Assistant Examiner—Vasu S. Jagannathan
Attorney, Agent, or Firm—Burns, Doane, Swecker & Mathis

[57] ABSTRACT

A process for preparing rubber modified high impact resins by dissolving a rubbery polymer in a monomer containing an aromatic vinyl monomer or a mixture of an aromatic vinyl monomer and a vinyl cyanide monomer followed by polymerizing the monomer, the two steps being carried out in at least two polymerization reactors with a particle disperser placed between the first and second reactors. High impact resins having excellent surface properties are obtained with a savings in a power consumption by controlling:

(1) the relationship between the concentration of the polymerized monomer and the content of the rubbery polymer in the first reactor;
(2) the relationship between the volume occupied by the polymerizing liquid in the first reactor and the inner volume of the particle disperser; and
(3) the peripheral linear velocity of a shearing stirrer in the particle disperser.

7 Claims, No Drawings

CONTINUOUS PROCESS FOR PREPARING RUBBER MODIFIED HIGH IMPACT RESIN

This application is a continuation of application Ser. No. 07/455,132, filed Dec. 22, 1989 now abandoned.

BACKGROUND OF THE INVENTION

1) Field of the Invention

The present invention relates to a continuous process for preparing rubber modified high impact resins.

More specifically, the present invention relates to the process in which, when a starting solution obtained by dissolving a rubber-like polymer in a starting monomer containing an aromatic vinyl monomer or a mixture consisting of an aromatic vinyl monomer and a vinyl cyanide monomer is subjected to a continuous polymerization reaction by using a bulk polymerization process or solution polymerization process, the rubber-like polymer used is brought into a desired particle size dispersed in the reacting liquid.

2. Description of the Prior Art

High impact polystyrene resins (hereinafter abbreviated as HI-PS resin), which are obtained by polymerizing styrene in the presence of a rubber-like polymer, are a kind of polystyrene resin having improved impact strength and are widely used in various application fields. Recently, the method for producing the HI-PS resin, is mainly a continuous bulk polymerization process although the resin is partially prepared still by a batchwise polymerization using a bulk or suspension polymerization process.

Such continuous method has heretofore been widely used for preparing the rubber modified styrene resin in which the rubber-like polymer is dispersed in the resin as particles having an average particle size of from 0.1 to 10μ. Since the particle size of the rubber-like polymer in the resin produced gives important influences on the resin properties such as impact strength and surface gloss, the operating process for controlling the particle size of the rubber-like polymer in the resin holds an important position in the techniques for preparing the rubber modified polystyrene resins.

Generally, the particle size and the particle form of the rubber-like polymer dispersed in the rubber modified styrene resin are settled depending on operating conditions in the period of time of the polymerization reaction, in which period the reacting liquid containing the rubber-like polymer in the course of the polymerization reaction varies from the state of a continuous phase into the state of an interrupted phase, namely the operation conditions for forming the dispersed rubber particles (this operation is hereinafter referred to as "particle forming operation" in the present invention). A continuous preparation method of the rubber modified styrene resins, is more difficult than a continuous preparation method of ordinary styrene resins containing no rubber-like polymer or a batchwise method of preparing a rubber modified styrene resins, because in the continuous preparation method of the rubber modified styrene resins, the particle forming operation is conducted under the conditions accompanying the transfer operation of the reacting liquid from one reactor to another and the polymerization reaction. Therefore, some processes which are complicated have heretofore been proposed for solving such difficulty. For example, a process, in which a preliminary polymerization referred to as the preliminary grafting of the rubber-like polymer is performed prior to the particle forming operation, has been proposed in Japanese Patent Publication No. 29793/1977. A process, in which the polymerizing solution has already reached a monomer conversion in the range of from 30 to 80 percent is mixed with the starting monomer to be polymerized, has been proposed in Japanese Patent Laid-open No. 7794/1978. In Japanese Patent Publication No. 17725/1984, a process in which a part of the polymerizing solution is recycled to the starting monomer system, has also been proposed.

It has also been well known that a procedure of strongly stirring the polymerizing liquid in the early polymerization stage wherein the conversion of the monomer is low, is effective as an operating manner for changing the continuous phase containing the rubber-like polymer (hereinafter abbreviated as "rubber phase") to rubber particles dispersed in the polymerizing liquid. It has also been known in Japanese Patent Publication No. 9245/1987 that a polymerization reactor of the stirred vessel type is effective in such step of the particle forming operation. Although it is simple, it requires a large amount of agitation power for forming the particles having a particle size of 0.6μ or smaller.

So-called ABS resins which are obtained by polymerizing styrene and acrylonitrile in the presence of a rubber-like polymer have various applications because of their excellent impact strength, chemically resistant properties, heat resistant properties, stiffness, surface gloss and the like. ABS resin is generally produced in a so-called emulsion polymerization process in which a latex containing a rubber-like polymer component is added to monomers of styrene and acrylonitrile, and then the mixture thus obtained is polymerized. Generally, the emulsion polymerization process has such problems that the facilities for its polymerization step become larger by the reason of using a latex in an amount of several times of the polymer, and that the control of its whole procedure becomes complicated because various steps such as emulsifying step, coagulating step and drying step, are essentially required in the process, and, moreover, the resins thus obtained are contaminated with impurities such as emulsifiers, coagulants which inevitably be used in the process. As a manner for improving such emulsion polymerization process, there is proposed a method in Japanese Patent Publication Nos. of 35354/1974 and 35355/1974 that, after extracting the rubber component as is in the latex to be used into the monomers of styrene and acrylonitrile to be polymerized, the monomers containing the rubber component are then polymerized by using a continuous bulk polymerization process to produce ABS resin. Although the procedure of this process is considerably simplified in comparison with a conventional emulsion polymerization process, the complicated extraction step remains in the process.

As other processes for preparing ABS resin, some continuous bulk polymerization processes or solution polymerization processes have been proposed in Japanese Patent Publication No. 20303/1970, and Japanese Patent Laid-open Nos. 9144/1972 and, 36201/1980. These processes have merits that the steps of polymerization and the after treatment in the process are simplified and that the amount of waste substances, which are to be wasted and will become a cause of environmental pollution, is decreased. However, these processes had such problems that the physical properties of the resins prepared by using such processes are not always excellent and especially one of the remarkable feature of ABS, the surface gloss of the molded resins, is inferior and that a special equipment is required in the process.

In the preparation of ABS resins by using a continuous bulk polymerization process or solution polymerization process, the particle size of the rubber-like polymer dispersed in the resin gives a remarkable influence on the resulting resin in physical properties such as impact strength, surface gloss and the like. Therefore, the operating manner for controlling the particle size of the rubber-like polymer in the resins holds a important position in the techniques for preparing ABS resins. It is well known that a process of strongly stirring the polymerizing liquid, which is in the early polymerization stage having a low conversion of the monomer used, is effective as an operating manner for changing the continuous phase containing the rubber-like polymer (hereinafter abbreviated as "rubber phase") to the rubber particles dispersed in the polymerizing liquid. The present inventors have also proposed such a manner in Japanese Patent Publication No. 2284/1988 that a reactor of stirred vessel type is used in such a process stage. Although this process is simple, the process requires a very large amount of agitation power for making the rubber particles having a particle size of $0.8\mu$ or smaller.

Japanese Patent Publication No. 18477/1974 discloses that the rubber particles having a desired size can be obtained by applying a shearing treatment with a particle dispersing machine to rubber particles previously generated in the polymerizing liquid. In this manner, after the shearing treatment of the rubber particles with the dispersing machine, the cross-linking reaction of the rubber-like polymer and the polymerization reaction of the whole monomers are completed concurrently by adding a cross-linking agent to the polymerizing liquid containing the sheared rubber particles and by maintaining the polymerizing liquid at a temperature in the range of from 150° to 200° C.

However, it is recently desired to improve the method of the particle forming operation in the continuous production processes of the rubber modified high impact resins such as HI-PS resins and ABS resins, for answering the demand of the market which desires higher physical properties of such resins due to the broadened application of such resins and for answering to the increased need of lowering the production cost of such resins by using a more efficient preparing process.

SUMMARY OF THE INVENTION

The purpose of the present invention is to provide a process for answering to the above necessities by which process the rubber modified high impact styrenic resins, such as HI-PS resins and ABS resins, containing rubber particles of a desired particle size and having excellent external appearance can be obtained with a very high efficiency without large consumption of agitation power and complicated operation procedure, for controlling the particle size of the rubber-like polymer.

The process of the present invention for continuously preparing rubber modified high impact resins is characterized in that, in a process using at least two polymerization reactors and a particle disperser, which is a machine for dispersing the rubber-like polymer in the resins in the form of fine rubber particles, and having the steps of (1) a starting solution obtained by dissolving a rubber-like polymer in a starting monomer consisting of at least one aromatic vinyl monomer or a mixture of at least one aromatic vinyl monomer and at least one vinyl cyanide monomer is continuously supplied into the first polymerization reactor; (2) the polymerization reaction of the starting monomer in the first reactor is performed until the concentration of the polymer obtained from the starting monomer in the first reactor has reached an extent required to convert the dissolved rubber-like polymer into its particles dispersed in the reacting liquid; (3) the reacting liquid is continuously taken out of the first reactor in an amount corresponding to the amount of the starting solution supplied into the first reactor; (4) then, the reacting liquid taken out of the first reactor is transferred into the particle disperser having one shearing stirrer composed of rotatable blade or cylindrical rotor and rotating at a high speed for subjecting the particles of the rubber-like polymer formed in the reacting liquid to the shearing treatment by the shearing stirrer; (5) the reacting liquid, which has been subjected to the shearing treatment in the particle disperser, is then fed into the second polymerization reactor in which the amount of the polymer formed from the starting monomer is maintained at a value of 25% or more as the conversion ratio of the starting monomer to the monomer, and then the polymerization reaction of the reacting liquid is continued in the second reactor and, if needed, the following polymerization reactors of the third, fourth and the like, successively; the polymerizaing reaction is conducted within the operation conditions of (A) satisfying the following formula of $$V_2/V_1 < 0.2,$$

wherein $V_1$ is the volume occupied by the reacting liquid in the first reactor and $V_2$ is the inner volume of the particle disperser; (B) maintaining the peripheral linear velocity of the shearing rotor at a value of 0.5 meter per second or more; and (C) satisfying the following formulas of $$1 < X_1 \leqq 20$$

and $$1.5 X_1 - 0.05 X^2_1 < X_2 < 4.5 X_1 - 0.05 X^2_1,$$

wherein $X_1$ is the ratio of the rubber-like polymer to the reacting liquid at the exit of the first reactor by weight percent and $X_2$ is the ratio of the polymer formed from the starting monomer to the reacting liquid at the exit of the first reactor by weight percent.

By using the above-described process of the present invention, the generation of large rubber particles which are observed as so-called "fish-eyes" or inferior external appearance on the surface of molded articles is prevented in the particle forming stage of the process, and moreover various kinds of the high impact resins can be desirably produced in a relatively simple preparing equipment by varying average particle size of the rubber particles, rubber content and kind of the rubber in the resin to be prepared in accordance with the needs of the market on the balance of physical properties of the resin such as impact strength, the surface gloss of molded articles and the like.

DESCRIPTION OF THE PREFERRED EMBODIMENTS

As the aromatic vinyl monomer in the process of the present invention, there can be used at least one monomer selected from the group consisting of styrene, α- alkylstyrenes such as α-methylstyrene, α-ethylstyrene, α-isopropylstyrene, α-tertiarybutylstyrene and the like; halogenated styrenes such as α-chlorostyrene, α-bromostyrene and the like; α-halogenated alkylstyrenes such as α-chloromethylstyrene, α-bromomethylstyrene and the like; styrene compounds having an alkyl-substituted benzene ring such as o-, m- and p-methylstyrene, o-, m- and p-tertiarybutyl-styrene and the like; styrene compounds having an halogen-substituted benzene ring such as o-, m- and p-chlorostyrene, o-, m- and p-bromostyrene and the like; and styrene compounds having an halogen-substituted alkyl on the benzene ring such as o-, m- and p-chloromethylstyrene, o-, m- and p-bromomethylstyrene and the like. In particular, styrene, α-methylstyrene and p-methylstyrene are preferably used.

As the vinyl cyanide monomer for the process of the present invention, there can be used at least one monomer selected from the group consisting of acrylonitrile and methacrylonitrile.

If needed, at least one monomer selected from the group consisting of monomers of acrylic esters such as methyl methacrylate, maleic anhydride, maleimide and the like, which are copolymerizable with monomers described hereinabove, may additionally be added to the above-described monomer.

In the case of using an aromatic vinyl monomer and a vinyl cyanide monomer, the mixing ratio of the aromatic vinyl monomer/vinyl cyanide monomer in the starting solution is selected at a value in the range of from 95/5 to 50/50. The mixing ratio out of the above-described range is not preferable because, when the ratio of the aromatic vinyl monomer/vinyl cyanide monomer is greater than 95/5, the resulting ABS resin is inferior in its chemical-resistant properties, stiffness and heat-resistant properties, and on the other hand, when the ratio of the aromatic vinyl monomer/vinyl cyanide monomer is smaller than 50/50, the resulting ABS resin is inferior in its flowability and surface gloss of molded articles.

As the rubber-like polymer for the process of the present invention, any conventional rubber-like polymer can be used so long as it is soluble in the monomer described above. As examples of such rubber-like polymers, there may be mentioned polybutadiene rubber, styrene-butadiene copolymer rubber, styrene-butadiene block copolymer rubber, acrylonitrile-butadiene copolymer rubber, chloroprene rubber, ethylene-propylene copolymer rubber. These rubbers can be used solely or in combination of two or more. A rubber having a viscosity of 100 centipoises or lower in its styrene solution of 5% by weight at 25° C., is suitable as such a rubber-like polymer when the aromatic vinyl monomer and the vinyl cyanide monomer are used in combination. As well known, in a bulk or solution polymerization process, the rubber component which had initially been existing as its homogeneous solution dissolved in a starting monomer composition forms particles dispersed in the solution by phase separation occurring at a value of above a certain conversion ratio of the starting monomer to the polymer. This phenomenon is referred to as so-called "phase inversion". When the above-described solution viscosity of the rubber component is greater than 100 centipoises in the case the aromatic vinyl monomer and the vinyl cyanide monomer are used in combination, the rubber particles formed in the first reactor become large. Such large rubber particles can not be converted to a sufficiently small particle size even if the particle disperser, which will hereinafter be described in more detail, is used, and the resulting resin becomes inferior in the surface gloss of molded articles. Therefore, the use of such high viscosity rubber is not preferable.

A starting solution dissolving a rubber-like polymer only in a starting monomer consisting of at least one aromatic vinyl monomer or a mixture of at least one aromatic vinyl monomer and at least one vinyl cyanide monomer, may be employed as the starting solution used in the process of the present invention. However, if needed, other solvents such as aromatic hydrocarbons, aliphatic hydrocarbons, alicyclic hydrocarbons, halogenated hydrocarbons, ketones and the like may be added to the starting solution described above. In this case, the amount of such solvent to be used is preferable in an amount not more than 50 parts by weight per 100 parts by weight of the starting monomer to be supplied into the first reactor. The reason is in that, when the solvent is used in an amount greater than the 50 parts by weight per 100 parts by weight of the starting monomer, not only the effective volume of the polymerization reactor is substantially decreased but also an excessively larger amount of energy is required for the recovery of such solvent used, and the total production efficiency is also lowered. The starting solution in the process of the present invention includes a starting solution containing such solvents and other various additives which will be described hereinafter.

In the process of the present invention, when a mixture of an aromatic vinyl monomer and a vinyl cyanide monomer is used as the starting monomer, the polymerization reaction of the starting solution continuously fed into the first reactor can be conducted with the addition of a radical polymerization initiator as the catalyst for the polymerization. As examples of suitable radical polymerization initiators to be used, there may be mentioned various organic peroxides and azo compounds. However, in these radical polymerization initiators, an initiator, of which the decomposing temperature corresponding to its half-life of 10 hours is 100° C. or lower, preferably 90° C. or lower, is preferred. As such polymerization initiators, there are lauroyl peroxide, tertiarybutyl peroxy(2-ethylhexanoate), benzoyl peroxide, 1,1-bis(tertiarybutylperoxy)-3,3,5-trimethylcyclohexane, azobisisobutyronitrile, azobis-2-methylbutyronitrile. These polymerization initiators are used solely or in combination of two or more. When a mixture of an aromatic vinyl monomer and a vinyl cyanide monomer is employed as the starting monomer to be polymerized and the polymerization reaction of such a starting monomer is performed thermally without any radical polymerization initiator, the rubber particles formed in the first reactor become so large in their size by unknown reasons that the formed particles can not be converted to the particles having a sufficiently small size even if the reacting liquid containing the rubber particles is treated by using a particle disperser. Therefore, such an operation mode is not preferred because the resulting particle size can not be controlled in a desired range. In addition, the polymerization reaction performed in the presence of a radical polymerization initiator of which the decomposition temperature corresponding to its half-life of ten hours is higher than 100° C., is not preferred by the reason that the higher polymerization temperature is required due to the thermal decomposition property of the initiator used and the proportion of the thermally initiated polymer to the resulting total polymer is increased and, as the result, the effect of using the initiator in the polymerization is therefore decreased. The radical polymerization initiator to be supplied in the first reactor is preferably used in an amount of 30 ppm or more, preferably in an amount of 50 ppm or more, based on the amount of the starting solution supplied to the first reactor. The use of the radical polymerization initiator in an amount less than 30 ppm is not preferred because a higher polymerization temperature is also required due to the too small amount of the initiator used and the proportion of the thermally initiated polymerization to the resulting total polymer is increased and the effect of using the initiator in the polymerization is therefore decreased similarly.

As the first polymerization reactor of the present invention, there may be used any stirred reactors of completely mixing type, tower-like reactors of plug-flow type or the like. When a reactor of the stirred type is employed as the first reactor, the conversion ratio of the starting monomer to the polymer in the stirred reacting liquid of the first reactor must be kept so as to maintain the concentration of the thus formed polymer in the liquid at a value above concentration required for converting the rubber-like polymer in the liquid to rubber particles dispersed in the liquid. When a reactor of the tower type is employed as the first reactor, the conversion ratio of the starting monomer to the polymer in the reacting liquid flowing out of the first reactor must also be kept so as to maintain the concentration of the thus formed polymer in the liquid at above a value of a certain concentration required for converting the rubber-like polymer in the liquid to rubber particles dispersed in the liquid.

In the process of the present invention, it is required that the polymerization reaction is conducted under the reaction condition of satisfying the following formulas of $$1 < X_1 \leq 20$$

and $$1.5\, X_1 - 0.05\, X^2_1 < X_2 < 4.5\, X_1 - 0.05\, X^2_1.$$

wherein $X_1$ is the proportion of the rubber-like polymer to the reacting liquid flowing out of the first reactor by weight percent and $X_2$ is the proportion of the polymerized monomer to the reacting liquid flowing out of the first reactor by weight percent. In the case of $X_1 \leq 1$, the rubber content in the resulting resin obtained under ordinary operation conditions is so low that the resulting resin can not actually be utilized as a rubber modified high impact resin. On the other hand, in the case of $X_1 > 20$, the viscosity of the reacting liquid increases to so a high value that the power required for stirring the reacting liquid in the first reactor becomes a remarkably greater value and that the rubber-like polymer can not be converted to its particles dispersed in the reacting liquid or huge rubber particles are generated even when the rubber-like polymer could be converted to its particles. $X_1$ is preferably selected in the range of $2 < X_1 \leq 15$. With regard to the value of $X_2$, in the case of $X_2 \leq 1.5\, X_1 - 0.05\, X^2_1$, the conversion ratio of the starting monomer to the polymer is so low that the rubber-like polymer can not be changed to the rubber particles. When the conversion ratio of the starting monomer to the polymer in the reacting liquid at the exit of the first reactor is too low and, as the result, the rubber-like polymer is not converted to a particulate state, the size of the rubber particles can not be controlled to a desired value, even if the reacting liquid is treated by using the particle disperser which will be described hereinafter in more detail. Therefore, the purpose of the present invention can not be achieved.

In the case of $X_2 \geq 4.5\, X_1 - 0.05\, X^2_1$, the viscosity of the reacting liquid at the exit of the first reactor becomes very high so that the following treatment of the reacting liquid by using the particle disperser becomes difficult and the effects of the treatment are not remarkable.

When the starting monomer is a mixture of an aromatic vinyl monomer and a vinyl cyanide monomer, it is preferred that the values of $X_1$ and $X_2$ satisfy the following formulas of $$1 < X_1 \leq 15$$

and $$2.0\, X_1 - 0.05\, X^2_1 < X_2 < 4.0\, X_1 - 0.05\, X^2_1.$$

In the case of $X_1 \leq 1$, the rubber content in the resulting resin obtained under ordinary operation conditions is so low that the resulting resin can not actually be utilized as a rubber modified high impact resin. On the other hand, in the case of $X_1 > 15$, the viscosity of the reacting liquid in the first reactor becomes so high that the power required for stirring the reacting liquid increases to a remarkably greater level and that the rubber-like polymer in the first reactor can not be converted to rubber particles dispersed in the liquid or that huge rubber particles are generated even when the rubber-like polymer could be converted to a particulate state. $X_1$ is ordinary and preferably selected in the range of $2 < X_1 \leq 12$. With regard to the value of $X_2$, in the case of $X_2 \leq 2.0\, X_1 - 0.05\, X^2_1$, the conversion ratio of the starting monomer to the polymer is so low that the rubber-like polymer can not be converted to rubber particles in the first reactor or that the particles obtained become unstable and large particles even when the rubber-like polymer could be broken to a particulate state. When the conversion ratio of the starting monomer to the polymer in the reacting liquid at the exit of the first reactor is low and, as the result, the rubber-like polymer in this liquid is not converted to a particulate state or, even if the rubber-like polynmer could be converted to a particulate state, the particles obtained are unstable and large; the size of the rubber particles can not be controlled to a desired value or huge particles are generated, even if the reacting liquid is treated with the particle disperser. Therefore, such reaction conditions do not coincide with the purpose of the present invention.

In addition, in the case of $X_2 \geq 4.0\, X_1 - 0.05\, X^2_1$, the viscosity of the reacting liquid at the exit of the first reactor becomes so high that the following treatment of the reacting liquid by the particle disperser becomes difficult and the effects of the treatment do not appear remarkably.

In the first polymerization reactor of the present invention, a starting solution obtained by dissolving a rubber-like polymer in a starting monomer consisting of at least one aromatic vinyl monomer or a mixture of at least one aromatic vinyl monomer and at least one vinyl cyanide monomer and, if needed, by further adding a solvent, and a radical polymerization initiator are continuously supplied therein, and polymerization reaction is performed so as to obtain the concentration of the resulting polymer in the reacting liquid higher than a certain concentration required for converting the rubber-like polymer to rubber particles dispersed in the reacting liquid. If needed, a molecular weight arrangement agent such as mercaptans can be added into the first reactor. The polymerization temperature is usually in the range of from 50° to 150° C. In the case of using a mixture of an aromatic vinyl monomer and a vinyl cyanide monomer as starting monomer, the reaction temperature is preferably selected in the range of from 60° to 130° C.

In this connection, the conversion ratio of the starting monomer to the polymer, as well as the concentration $X_2$ by weight percent of the resulting polymer in the reacting liquid, can be controlled by varying the operating conditions such as polymerization temperature, composition of the materials supplied in the first reactor, feeding rate of such materials, the amount of the polymerization initiator and the like.

In the first reactor, the polymerization reaction is usually conducted while stirring the reacting liquid using an agitator. When the rubber-like polymer changes to rubber particles, the size of the resulting rubber particles depends on the stirring strength. In the process of the present invention, since the size of the rubber particles is finally decided in the following particle disperser, the stirring strength in the first reactor may be selected so that a uniformly mixed state of the whole reacting liquid or the state without any portion staying out of the stirring in the reactor can be maintained.

The reacting solution is then continuously taken out of the first reactor in an amount corresponding to the amount of the starting solution supplying to the first reactor. The taken out liquid is then transferred into the particle disperser, which is installed between the first reactor and second reactor, and is then treated in the particle disperser so as to convert the rubber particles generated in the first reactor to the rubber particles having a desired size by shearing the former particles.

The particle disperser for shearing the dispersed particles of the rubber-like polymer in the process of the present invention is a compact stirring and mixing machine of such a kind that the machine has a shearing rotor, capable of revolving in a high speed and composed of blades or cylindrical rotors, in the inner portion of the machine and that the revolving blades or cylindrical rotors can give a high shearing speed to the reacting liquid within a short residence time of the reacting liquid in the particle disperser.

The inner volume of the particle disperser is selected so as to satisfy the following formula of $V_2/V_1 < 0.2$, preferably $V_2/V_1 < 0.15$, wherein $V_2$ is the inner volume of the particle disperser and $V_1$ is the volume occupied by the reacting liquid in the first reactor. When $V_2/V_1$ is not smaller than 0.2, the inner volume of the particle disperser becomes too large relative to the amount of the reacting liquid so that the average residence time of the reacting liquid in the particle disperser becomes large, and accordingly the conversion ratio of the starting monomer to the polymer in the reacting liquid and the viscosity of the reacting liquid increase within the prolonged residence time of the reacting liquid in the particle disperser, and that, as the result, the power required for revolving the shearing blade or rotor at a high speed becomes to large. Therefore, such a ratio of the volumes is not preferable.

In addition, it is required that the peripheral linear velocity v of the shearing blade or rotor is 0.5 meter per second or more.

Velocity v is expressed by the formula $$v = \pi . d . n \text{ (m/sec)}$$

wherein d(m) is the outside diameter and n is the revolution number per second (rps), of the shearing blade or rotor.

When the peripheral linear velocity v of the shearing blade or rotor is less than 0.5 m/sec., the shearing speed in the particle disperser against the rubber particles in the reacting liquid treated is not sufficient so that it becomes difficult to convert the rubber particles formed in the first reactor to the rubber particles having a desired size by using the particle disperser. In the process of the present invention, the rubber particles dispersed in the reaction liquid from the first reactor can be adjusted to a desired size by using the particle disperser. More specifically, the size of the converted rubber particles can be adjusted to a desired size by, for example, selecting the number n of revolutions of the shearing rotor per second at a suitable value.

When the shearing treatment by the particle disperser is performed without forced circulation of the reaction liquid by using a pump through a circulating line including the particle disperser described hereinbefore, the particle disperser is preferred to have at least three, more preferably at least four, shearing stirrers each composed of blades or cylindrical rotors. In the case of treating the reaction liquid by such a multi-stage particle disperser, the reaction liquid is needed to pass through these shearing rotor portions, successively, and any short pass out of such a portion is not preferred. Accordingly, it is preferred that baffles or stators are equipped in the space between respective shearing blades or rotors, or that chambers for equipping the respective shearing blades or rotors are installed in a series arrangement.

When the number of the shearing blades or rotors is less than three, the number of repeated times of shearing the rubber particles formed in the first reactor is insufficient so that it becomes difficult to convert the rubber particles generated in the first reactor to the rubber particles having a desired size by the particle disperser.

As the particle disperser in the process of the present invention, any shearing machine may be used as long as the machine satisfies the above-described conditions and can give a high shearing speed. For example, there is used a stirring and mixing machine which has at least three shearing blades each composed of three or more of blades or vanes, such as propeller type, paddle type, screw paddle type, turbine blade type or the like, equipped on the same rotatable shaft and has baffles between the respective shearing blades.

As the particle disperser, there is also used, for example, such a stirring and mixing machine that the machine is constituted of a unit combination composed of a cylindrical rotor and stator coaxially arranged with each other and comb-like cuts at each ends, and has at least two of such unit combinations so as to make a multi-layer structure of such unit combinations coaxially arranged in a chamber, or so as to make a series of multi-stage structures of such unit combinations arranged in different chambers with a common rotatable shaft, or so as to make a series of multi-stage constitution of the above multi-layer structures arranged in different chambers with a common rotatable shaft. In such a stirring and mixing machine as the particle disperser, it is preferred that the machine has at least three combinations of the rotor and stator. In this connection, the rotors equipped on a rotatable shaft of such a machine correspond to the shearing rotor described hereinbefore.

When the particle disperser constituted of the above-described combinations of a coaxial rotor and stator is used, it is preferred that the length h (in meters) of respective gaps between a rotor and stator adjacent each other and the peripheral linear velocity v defined hereinabove are in a relationship satisfying the following formula of $v/h \geq 200$, preferably $v/h \geq 300$.

In the particle disperser constituted of such combinations of a coaxial rotor and stator as described above, shearing force occurs in each gap between each rotor and stator. When v/h is smaller than 200, the shearing force occurred is not sufficient so that it becomes difficult to convert the rubber particles generated in the first reactor to the reformed rubber particles having a desired particle size by using the particle disperser.

As examples of such stirring and mixing machines as the particle disperser, there can be used IKA ULTRA-TURRX-INLINE and IKA DISPAX-REACTOR (trade name, a product of IKA Company), TK Hi-line Mill and TK Pipe-line Homomixer (trade name, a product of Tokushu Kika Kogyo Company), Ebara Milder (trade name, a product of Ebara Seisakusho) and the like.

In addition, the shearing treatment described hereinabove can also be repeated by using at least one particle disperser.

The reacting liquid in the first reactor is taken out of the first reactor in an amount corresponding to the amount of the starting solution being fed into the first reactor. The reacting liquid thus taken out is transferred into a circulation line, which is arranged for circulating the reaction liquid by a pump between the first and second reactors and has the particle disperser in the course of the circulation. The rubber particles generated in the first reactor are treated in the circulation line so as to convert the rubber particles in the reacting liquid to the reformed rubber particles of a desired size.

In this case, as well as the particle dispersers having shearing blades of the above-described types, there can also be used particle dispersers having shearing blades of other types, such as propeller type, paddle type, screw paddle type, turbine blade type, anchor arm type, spiral blade type or the like, each of which is rotatable at a high speed.

As examples of such particle dispersers as described above, there can be used so-called line mixers such as a mixer of crossed berth type with baffles (a product of Mixing Equipment Company), a mixer of angle type with baffles (a product of Chemineer Company), a mixer of eccentric angle type with baffles (a product of Satake Kagakukogyo Company), a mixer of straight pipe type with orifices (a product of Satake Kagakukogyo Company), and the like. In the case of using any of these mixers, the limitation of the peripheral linear velocity (0.5 m/sec. or faster) is required by the reason described hereinbefore.

When the reacting liquid is treated by the particle disperser while circulating through the circulation line, the volume of the circulation is selected so as to satisfy the following formula of $$1.5 < F_2/F_1 < 30, \text{ preferably } 2.0 < F_2/F_1 < 30,$$

wherein $F_1$ is the volume of the starting solution feeding into the first reactor per unit time and $F_2$ is the volume of the circulation through the circulation line per the same unit time as in $F_2$. The ratio of $F_2/F_1$ indicates the number of the average treating times of the reacting liquid in the particle disperser. When the ratio of $F_2/F_1$ is not greater than 1.5, any effects of the circulation can not be expected because of too short a residence time of the reacting liquid in the circulating line. Conversely, when the ratio of $F_2/F_1$ is a value of 30 or greater, the size of the treated rubber particles is not further reduced despite any increased number of the circulation and treatment times of the reacting liquid in the particle disperser. Considering an installation to be used for the production of the proposed resins on a industrial scale, the last case is not preferred because a pump and circulating line of excessively large scale are required for circulating the reacting liquid to be treated.

The reacting liquid taken out of the first reactor and treated by the particle disperser is then fed continuously to the second polymerization reactor, and the polymerization reaction is continued therein. The second reactor is a reaction vessel of the stirred type. It be required to the reacting liquid in the second reactor that the conversion ratio of the starting monomer to the polymer be maintained at a value of 25% by weight or more. In this connection, the size distribution of the rubber particles in the resulting resin becomes broader when a reactor other than the stirred type, for example, a tower type reactor of which the conversion ratio of the starting monomer to the polymer in the reacting liquid at the exit of this reactor is different from that of the reaction liquid at the entrance of the reactor because of the piston flow type, is used as the second polymerization reactor, or when the conversion ratio of the starting monomer to the polymer in the reaction liquid of the second reactor is less than 25% by weight even if a stirred type reactor is used as the second reactor. Therefore, such reaction conditions are not preferred. In other words, the rubber particles formed in the particle disperser are required to be stabilized by feeding them into the reaction liquid having the high conversion ratio of the starting monomer to the polymer. As the second polymerization reactor in the process of the present invention, any reactor of the stirred type can be used as long as the reacting liquid in the reactor is well mixed by stirring equipment so as to maintain the reacting liquid in a uniform composition and temperature throughout the whole portions of the liquid. Such reactors are well known to any skilled person, and there may be mentioned, for example, a reaction vessel equipped with a stirrer having a screw type agitator with a draft tube or stirring blades of double helical ribbon type.

The reaction liquid which has been polymerized in the second reactor is continuously taken out of this reactor. The reaction liquid thus taken out is, as is or if needed after polymerizing further in at least one reactor of the stirred type or tower type, treated at a temperature in the range of, for example, from 180° to 260° C. under a vacuum to evaporate the unpolymerized monomer and the solvent previously added and to obtain the desired rubber modified high impact resin.

In the process of the present invention, a chain transfer agent, such as mercaptans, may ordinarily be used for controlling the molecular weight of the formed polymer. In the case of using a chain transfer agent, the whole amount of the agent required may be added to the starting solution to be supplied into the first reactor or a part of the agent may be added to the second reactor.

Further, if needed, an antioxidant such as alkylated phenols and a plasticizer or lubricant such as butyl stearate, zinc stearate, mineral oil and the like may be added to the starting solution or the reacting liquid in the course of the polymerization reaction or the stage where the polymerization has been completed.

EXAMPLES

The examples of the present invention will be described hereinafter.

EXAMPLE 1

A starting solution was obtained by dissolving 6.0 parts by weight of polybutadiene (Diene 55, a product of Asahi Kasei Corporation) in a mixture of 79.0 parts by weight of styrene as a starting monomer and 15.0 parts by weight of ethylbenzene as a solvent. After adding 0.1 part by weight of 2,6-ditertiarybutyl phenol to the starting solution, the starting solution was continuously supplied at a feed rate of 13.0 l/hr. ($F_1$) into the first reactor of full-fill type having an inner volume of 24.9 l ($V_1$) and a screw type stirring blade with a draught pipe. The polymerization reaction in the first reactor was conducted at a temperature of 130° C. and a stirrer revolution speed of 1.5 rps. (revolutions per second), and the phase transfer of the rubber-like polymer was performed, thereby the particles of the rubber-like polymer were formed in the reaction liquid. The reaction liquid at the exit of the first reactor contained 6% by weight of the rubber-like polymer and 20.5% by weight of polystyrene formed from the starting monomer (conversion of the monomer: 25.9%).

The reaction liquid in the first reactor was continuously taken out of the reactor and was fed to a circulation line equipped with a gear pump for circulating the reaction liquid and a particle disperser (line mixer) and was treated. The particle disperser had its inner volume ($V_2$) of 0.96 l and a shearing rotor having four inclined paddles of 0.08 m in outside diameter (d). In the circulation line, the reaction liquid taken out of the first reactor was circulated at a flow rate ($F_2$) of 100 l/hr. and the shearing rotor in the particle disperser was operated at a revolution speed (n) of 16.7 rps (1000 rpm: revolutions per minute). In these operating conditions, the ratio of the inner volumes of the particle disperser and the volume occupied by the reaction liquid in the first reactor, $V_2/V_1$, is 0.039, the ratio of the flow rate in the circulation line to the feeding rate of the starting solution to the first reactor, $F_2/F_1$, is 7.7, and the peripheral linear velocity of the shearing rotor is 4.2 m/sec.

The reaction liquid treated in the circulation line was continuously fed to the second full-fill type reactor which has an inner volume of 10.2 l and a screw type stirring blade with a draught pipe. The polymerization in the second reactor was conducted at a reaction temperature of 130° C. under a stirring blade revolution speed of 1.0 rps.

The reaction liquid in the second reactor was maintained at 34.2% by weight in the proportion of the polymerized monomer to the starting monomer. The reaction liquid polymerized in the second reactor was taken out of the reactor, and the reaction liquid thus taken out was supplied in the following third, fourth and fifth reactors of the tower type, successively, and polymerization was continued in these reactors having exiting liquid temperatures of 140° C., 150° C. and 160° C., respectively. The reaction liquid continuously taken out of the fifth reactor was then separated from the unpolymerized monomer and the solvent at a high temperature under high vacuum by using a well known apparatus for removing volatile materials, and was finally pelletized by using an extruder to obtain the product of HI-PS resin.

The average particle size of the rubber particles in the resin thus produced was measured as the volume average value on the basis of their photograph obtained by using an electron microscope. In addition, a part of the product was extruded as a film of 0.1 mm thickness, and the film was examined by counting the fish-eyes each having an area of 0.2 mm$^2$ or larger. The same methods for measuring the average particle size and the number of the fish-eyes as described above were used in the following Examples and Comparative Examples. The results of these measurements were shown in Table 1.

EXAMPLES 2 AND 3

The same procedure as in Example 1 was repeated with the exception that the flow rate $F_2$ in the circulating line was changed.

EXAMPLES 4 AND 5

The same procedure as in Example 1 was repeated with the exception that the revolution speed of the stirring rotor in the particle disperser of the circulating line was changed.

EXAMPLE 6

The same procedure as in Example 1 was repeated with the exception that the temperature in the first reactor was changed to 127° C.

EXAMPLE 7

The same procedure as in Example 6 was repeated with the exception that the amount of polybutadiene in the starting solution was changed to 9.0 parts by weight, and the amount of ethylbenzene was changed to 12.0 parts by weight, and the stirring conditions in the first reactor and particle disperser were changed as shown in Table 1.

COMPARATIVE EXAMPLE 1

The same procedure as in Example 1 was repeated with the exception that the circulation line between the first reactor and the second reactor and the particle disperser in the circulation line were omitted. A larger average size of the rubber particles and some huge rubber particles were observed in the product resin.

COMPARATIVE EXAMPLE 2

The same procedure as in Comparative Example 1 was repeated with the exception that the revolution speed of the stirring blade in the first reactor was changed to 4.5 rps (270 rpm). Although no huge particles were was observed in the product resin, the average size of the resulting rubber particles became larger in comparison with that in the case of Example 1.

COMPARATIVE EXAMPLE 3

The same procedure as in Example 1 was repeated with the exception that the revolution speed of the shearing rotor of the particle disperser in the circulation line was changed to 1.67 rps (100 rpm).

COMPARATIVE EXAMPLE 4

The same procedure as in Example 1 was repeated with the exception that a particle disperser having an inner volume of 9.7 l and a shearing rotor with four inclined paddles of 0.4 m in outside diameter (d), was used at its revolution speed of 3.3 rps (200 rpm) in place of the particle disperser in the Example 1.

COMPARATIVE EXAMPLE 5

The same procedure as in Example 1 was repeated with the exception that the reaction temperatures of the first and second reactors were changed so that the proportion of the polymerized monomer to the starting monomer in the second reactor was not more than 25% by weight.

COMPARATIVE EXAMPLE 6

The same procedure as in Example 1 was repeated with the exception that the reaction temperature of the first reactor was changed to 110° C. In this case, the concentration of the polymer formed from the starting monomer in the first reactor was not increased so that no phase transfer of the rubber-like polymer occurred, and the reacting liquid in the first reactor remained in a uniform phase. Even after the treatment in the circulation line and the particle disperser in the circulating line, the reacion liquid remained in a uniform phase. The rubber particles were not formed until raising the temperature of the reacting liquid in the second reactor.

COMPARATIVE EXAMPLE 7

The same procedure as in Example 1 was repeated with the exception that the reaction temperature of the first reactor was changed to 138° C. In this case, the concentration of the polymer formed from the starting monomer in the first reactor was too high that the particle size of the rubber particles formed in the first reactor was larger than that of the Example 1, and huge particles were also observed in these rubber particles. Even after treating the reaction solution in the circulation line and the line mixer in the circulation line, the average particle size of the rubber particles was larger in comparison with that of Example 1, and huge particles in a small number were observed.

COMPARATIVE EXAMPLE 8

The same procedure as in Example 1 was repeated with the exception that the composition of the starting solution was changed as shown in Table 2, the weight % of polybutadiene being 10%. In this case, although no huge particles were observed and the rubber particles having a small size were formed, the rubber content in the product thus obtained was too low that the impact strength of the product resin thus obtained was too low as a rubber modified high impact resin.

COMPARATIVE EXAMPLE 9

The same procedure as in Example 1 was repeated with the exception that the composition of the starting solution was changed as shown in Table 2, and polybutadiene of 21.0% by weight was used. In this case, the concentration of the rubber was so high that the reaction solution caused no phase transfer.

TABLE 1

| | | | Example | | | | | | |
|---|---|---|---|---|---|---|---|---|---|
| | | Unit | 1 | 2 | 3 | 4 | 5 | 6 | 7 |
| Starting solution | | | | | | | | | |
| Styrene | | Parts by weight | 79.0 | 79.0 | 79.0 | 79.0 | 79.0 | 79.0 | 79.0 |
| Ethylbenzene | | Parts by weight | 15.0 | 15.0 | 15.0 | 15.0 | 15.0 | 15.0 | 12.0 |
| Polybutadiene | | Parts by weight | 6.0 | 6.0 | 6.0 | 6.0 | 6.0 | 6.0 | 9.0 |
| Feeding rate of starting solution | $F_1$ | l/hr. | 13.0 | 13.0 | 13.0 | 13.0 | 13.0 | 13.0 | 13.0 |
| 1st reactor | | | | | | | | | |
| Volume | $V_1$ | l | 24.9 | 24.9 | 24.9 | 24.9 | 24.9 | 24.9 | 24.9 |
| Reaction temperature | | °C. | 130 | 130 | 130 | 130 | 130 | 127 | 127 |
| Revolution number of stirrer | | rps | 1.5 | 1.5 | 1.5 | 1.5 | 1.5 | 1.5 | 2.0 |
| Conversion of monomer at exit | | % | 25.9 | 25.9 | 25.9 | 25.9 | 25.9 | 22.1 | 24.1 |
| Concentration of polymerized monomer in reaction solution at exit | $x_2$ | wt. % | 20.5 | 20.5 | 20.5 | 20.5 | 20.5 | 17.5 | 19.3 |
| Flow rate in circulation line | $F_2$ | l/hr | 100 | 150 | 50 | 100 | 100 | 100 | 100 |
| Particle disperser | | | | | | | | | |
| Volume | $V_2$ | l | 0.96 | 0.96 | 0.96 | 0.96 | 0.96 | 0.96 | 0.96 |
| Outside diameter of circulation paddle | d | m | 0.08 | 0.08 | 0.08 | 0.08 | 0.08 | 0.08 | 0.08 |
| Revolution number of circulation paddle | n | rps | 16.7 | 16.7 | 16.7 | 25.0 | 8.3 | 16.7 | 25.0 |
| Peripheral linear velocity of circulation paddle | v | m/sec | 4.2 | 4.2 | 4.2 | 6.3 | 2.1 | 4.2 | 6.3 |
| $V_2/V_1$ | | — | 0.04 | 0.04 | 0.04 | 0.04 | 0.04 | 0.04 | 0.04 |
| $F_2/F_1$ | | — | 7.7 | 11.5 | 3.85 | 7.7 | 7.7 | 7.7 | 7.7 |
| 2nd reactor | | | | | | | | | |
| Reaction temperature | | °C. | 130 | 130 | 130 | 130 | 130 | 130 | 130 |
| Conversion of monomer | | % | 34.2 | 34.2 | 34.2 | 34.2 | 34.2 | 33.5 | 37.1 |
| Product | | | | | | | | | |
| Average size of rubber particles | | μ | 0.8 | 0.8 | 0.9 | 0.7 | 1.1 | 0.8 | 1.0 |
| Number of fish-eyes | | /1000 cm² | 0 | 0 | 0 | 0 | 0 | 0 | 0 |

TABLE 2

|  | Unit | Comparative example 1 | 2 | 3 | 4 | 5 | 6 | 7 | 8 | 9 |
|---|---|---|---|---|---|---|---|---|---|---|
| Starting solution |  |  |  |  |  |  |  |  |  |  |
| Styrene | Parts by weight | 79.0 | 79.0 | 79.0 | 79.0 | 79.0 | 79.0 | 79.0 | 84.0 | 64.0 |
| Ethylbenzene | Parts by weight | 15.0 | 15.0 | 15.0 | 15.0 | 15.0 | 15.0 | 15.0 | 15.0 | 15.0 |
| Polybutadiene | Parts by weight | 6.0 | 6.0 | 6.0 | 6.0 | 6.0 | 6.0 | 6.0 | 1.0 | 21.0 |
| Feeding rate of starting solution $F_1$ | l/hr. | 13.0 | 13.0 | 13.0 | 13.0 | 13.0 | 13.0 | 13.0 | 13.0 | 13.0 |
| 1st reactor |  |  |  |  |  |  |  |  |  |  |
| Volume $V_1$ | l | 24.9 | 24.9 | 24.9 | 24.9 | 24.9 | 24.9 | 24.9 | 24.9 | 24.9 |
| Reaction temperature | °C. | 130 | 130 | 130 | 130 | 124 | 110 | 138 | 130 | 130 |
| Revolution number of stirrer | rps | 1.5 | 4.5 | 1.5 | 1.5 | 1.5 | 1.5 | 1.5 | 1.5 | 1.5 |
| Conversion of monomer at exit | % | 25.9 | 26.3 | 25.9 | 25.9 | 19.4 | 8.9 | 34.8 | 26.8 | 24.2 |
| Concentration of polymerized monomer in reaction solution at exit $x_2$ | wt. % | 20.5 | 20.8 | 20.5 | 20.5 | 15.3 | 7.0 | 27.5 | 22.5 | 15.5 |
| Flow rate in circulation line $F_2$ | l/hr. |  |  | 100 | 100 | 100 | 100 | 100 | 100 | 100 |
| Particle disperser |  |  |  |  |  |  |  |  |  |  |
| Volume $V_2$ | l |  |  | 0.96 | 9.7 | 0.96 | 0.96 | 0.96 | 0.96 | 0.96 |
| Outside diameter of circulation paddle $d$ | m |  |  | 0.08 | 0.4 | 0.08 | 0.08 | 0.08 | 0.08 | 0.08 |
| Revolution number of circulation paddle $n$ | rps |  |  | 1.67 | 3.3 | 16.7 | 16.7 | 16.7 | 16.7 | 16.7 |
| Peripheral linear velocity of circulation paddle $v$ | m/sec |  |  | 0.42 | 4.1 | 4.2 | 4.2 | 4.2 | 4.2 | 4.2 |
| $V_2/V_1$ | — |  |  |  | 0.39 | 0.04 | 0.04 | 0.04 | 0.04 | 0.04 |
| $F_2/F_1$ | — |  |  | 7.7 | 7.7 | 7.7 | 7.7 | 7.7 | 7.7 | 7.7 |
| 2nd reactor |  |  |  |  |  |  |  |  |  |  |
| Reaction temperature | °C. | 130 | 130 | 130 | 130 | 120 | 140 | 130 | 130 | 130 |
| Conversion of monomer | % | 32.9 | 33.5 | 32.2 | 39.2 | 23.7 | 21.1 | 40.0 | 35.9 | 32.5 |
| Product |  |  |  |  |  |  |  |  |  |  |
| Average size of rubber particles | μ | 3.2 | 1.5 | 2.5 | 2.6 | 1.3 | 5.1 | 1.7 | 0.6 | — |
| Number of fish-eye | /1000 cm² | 24 | 0 | 6 | 8 | 3 | 42 | 4 | 0 | — |

EXAMPLE 8

A starting solution was obtained by dissolving 6.0 parts by weight of polybutadiene (Asaprene 700A, trade name, a product of Asahi Kasei Corporation) in a starting monomer consisting of 55.5 parts by weight of styrene, 18.5 parts by weight of acrylonitrile (ratio of styrene to acrylonitrile is 75/25) and 20.0 parts by weight of ethylbenzene. The Asaprene solution of 5% by weight in styrene has a viscosity of 45 centipoise at 25° C. After adding 0.2 part by weight of tertiarydodecylmercaptan as molecular weight adjusting agent, 0.02 part by weight of benzoyl peroxide (BPO: its decomposition temperature corresponding to the half-life period of ten hours is 74° C.) as radical polymerization initiator and 0.2 part by weight of 2,6-ditertiarybutyl phenol as antioxidant to the starting solution, the starting solution was continuously supplied at a feeding rate of 15.0 l/hr. ($F_1$) into the first reactor of full-fill type having an inner volume of 18.0 l ($V_1$) and a screw type stirring blade with a draught pipe. The polymerization reaction in the first reactor was conducted at a temperature of 110° C. with a revolution number of the stirring blade at 1.5 rps. The phase transfer of the rubber-like polymer was performed, thereby the particles of the rubber-like polymer were formed in the reacting liquid. The reaction liquid at the exit of the first reactor had 6.0% by weight of the rubber-like polymer content ($X_1$) and 16.3% by weight of the polymer content formed from the monomer (conversion: 22.0%).

The reaction liquid was continuously taken out of the first reactor and was fed to a circulation line composed of a gear pump for circulation of the reacting liquid thus supplied and a line mixer, and was treated thereat. The same line mixer as used in Example 1 was employed. In the circulation line, the reaction liquid taken out of the first reactor was circulated at a flow rate ($F_2$) of 120 l/hr. and the stirring blades in the line mixer was operated at a revolution number ($n$) of 16.7 rps (1000 rpm). In these operating conditions, the ratio of the inner volumes of the line mixer and the first reactor, $V_2/V_1$, is 0.053, and the ratio of the flow rate in the circulating line to the feeding rate of the starting solution to the first reactor, $F_2/F_1$ is 8.0, and the circumferential linear velocity of the stirring blade is 4.2 m/sec.

The reaction liquid treated in the circulating line was fed continuously to the same second reactor as used in Example 1, and the polymerization was continued. The polymerization in the second reactor was conducted at a reaction temperature of 110° C. under a stirring blade revolution number of 1.0 rps. The proportion of the polymerized monomer in the second reactor to the starting monomer was 33.8% by weight.

The reaction liquid polymerized in the second reactor was continuously taken out of the reactor, and was supplied into the following third, fourth and fifth reactors, which were equipped with the same screw type stirring blade and the same draught pipe as used in the first and second reactors and was continued its polymerization at a temperature of 110° C., 120° C. and 130° C., respectively. The reaction liquid was continuously taken out of the fifth reactor and then separated from the unpolymerized monomer and the solvent at a high temperature under high vacuum by using a well known apparatus for removing volatile materials, and was finally pelletized by using an extruder to obtain the product of so-called acrylonitrile-butadiene-styrene (ABS) resin.

The average particle size of the rubber particles in the product thus obtained was measured as the volume average value on the basis of their photograph obtained by using an electron microscope. In addition, a part of the product was extruded as a film of 0.1 mmm thickness, the film was examined by counting the fish-eyes having an area of 0.2 mm² or larger. Further, a test piece was made by using a 4 oz. injection molding machine and the surface gloss of the test piece was measured by using an incidence angle of 60° in accordance with the method of JIS Z-8741.

The operation conditions and the results of these measurements are shown in Table 3. The evaluation results for the following Examples and Comparative Examples are shown in Tables 3 and 4 respectively.

EXAMPLES 9 AND 10

The same procedure as in Example 8 was repeated with the exception that the flow rate $F_2$ in the circulation line was changed.

EXAMPLES 11 AND 12

The same procedure as in Example 8 was repeated with the exception that the revolution speed of the stirring blade in the line mixer of the circulating line was changed.

EXAMPLE 13

The same procedure as in Example 8 was repeated with the exception that the reaction temperature in the first reactor was changed.

EXAMPLE 14

The same procedure as in Example 8 was repeated with the exception that the amount of polybutadiene in the starting solution was changed to 8.0 parts by weight, and the amounts of styrene and acrylonitrile used and the temperature in the first reactor were changed as shown in Table 3.

EXAMPLE 15

The same procedure as in Example 8 was repeated with the exception that a styrene-butadiene copolymer (Toughdene 2000A, trade name, a product of Asahi Kasei Corporation, the viscosity of its 5% solution in styrene is 50 centipoises at 25° C.) was used as the rubber-like polymer.

EXAMPLE 16

The same procedure as in Example 8 was repeated with the exception that lauroyl peroxide (LPO) whose decomposition temperature corresponding to a half-life period of ten hours is 62° C., was used in an amount of 0.04 part by weight as the radical polymerization initiator in place of benzoyl peroxide, and the polymerization temperature in the first reactor was changed to 105° C.

COMPARATIVE EXAMPLE 10

The same procedure as in Example 8 was repeated with the exception that the circulating line between the first reactor and the second reactor and the line mixer in the circulating line were omitted. A larger average size of the rubber particles and some huge rubber particles were observed.

COMPARATIVE EXAMPLE 11

The same procedure as in Comparative Example 10 was repeated with the exception that the revolution number of the stirring blade in the first reactor was changed to 6.0 rps (360 rpm). Although no huge particles were observed, the average size of the rubber particles became larger in comparison with that in the case of Example 8.

COMPARATIVE EXAMPLE 12

The same procedure as in Example 8 was repeated with the exception that the revolution number of the line mixer in the circulating line was changed to 1.67 rps (100 rpm).

COMPARATIVE EXAMPLE 13

The same procedure as in Example 8 was repeated with the exception that the same line mixer as used in Comparative Example 5, was used at its revolution number of 3.3 rps (200 rpm) in place of the line mixer in the Example 8.

COMPARATIVE EXAMPLE 14

The same procedure as in Example 8 was repeated with the exception that the reaction temperature of the first and second reactors were changed to such conditions that the proportion of the polymerized monomer in the second reactor to the starting monomer was maintained at a value of 25% by weight or smaller.

COMPARATIVE EXAMPLE 15

The same procedure as in Comparative Example 14 was repeated with the exception that the reaction temperatures of the first reactor was changed to 95° C. In this case, the concentration of the polymer formed from the starting monomer in the first reactor was not increased sufficiently so that no phase transfer of the rubber-like polymer occurred, and the reaction solution in the first reactor remained in a uniform phase. Even after the treatment in the circulating line and the line mixer in the circulating line, the rubber particles were not formed. After raising the temperature of the second reactor to 120° C., the formation of the rubber particles was observed.

COMPARATIVE EXAMPLE 16

The same procedure as in Example 8 was repeated with the exception that the reaction temperature of the first reactor was changed to 123° C. In this case, the concentration of the polymer formed from the starting monomer was too high so that the particle size of the rubber particles formed in the first reactor was larger than that of the Example 8, and huge particles were also observed in these rubber particles. Even after treating the reacting solution in the circulating line and the line mixer in the circulating line, the average particle size of the rubber particles was larger in comparison with that of Example 8, and huge particles in a small number were observed.

COMPARATIVE EXAMPLE 17

The same procedure as in Example 8 was repeated with the exception that the weight ratio of styrene to acrylonitrile in the starting monomer was changed to 40/60 (29.6 parts by weight of styrene and 44.4 parts by weight of acrylonitrile), and the amount of tertiarydodecyl mercaptan was changed to 0.3 part by weight. ABS resin thus obtained was somewhat decreased in its surface gloss, and its flowability was also deteriorated.

COMPARATIVE EXAMPLE 18

The same procedure as in Example 8 was repeated with the exception that a high viscosity polybutadiene (Diene 55A, trade name, a product of Asahi Kasei Corporation, the viscosity of its 5% solution in styrene is 160 centipoises at 25° C.) was used as the rubber-like polymer taking the place of polybutadiene in Example 8. The average particle size in the product resin thus obtained became large, and its surface gloss became also inferior.

COMPARATIVE EXAMPLE 19

The same procedure as in Example 8 was repeated with the exception that ditertiarybutyl peroxide whose decomposition temperature corresponding to a half-life period of ten hours is 124° C., was used in an amount of 0.04 part by weight as the radical polymerization initiator in place of benzoyl peroxide, and the polymerization temperature in the first reactor was changed to 126° C. The product resin thus obtained was large in its average particle size, and it surface gloss was also inferior.

COMPARATIVE EXAMPLE 20

The same procedure as in Example 8 was repeated with the exception that the polymerization reaction was thermally performed at the first reactor temperature of 130° C. without adding the radical polymerization initiator. The product resin thus obtained was large in its particle size, and it surface gloss was also inferior.

COMPARATIVE EXAMPLE 21

The same procedure as in Example 8 was repeated with the exception that the starting solution was changed to a mixture of 16 parts by weight of the rubber-like polymer used in example 8, 48.0 parts by weight of styrene, 16.0 parts by weight of acrylonitrile and 20.0 parts by weight of ethylbenzene. In this operation, the concentration of the rubber-like polymer in the first reactor was too high so that the viscosity of the reacting liquid in the first reactor was remarkably increased to the state of a gel, and as the result, any normal product resin could not be obtained.

COMPARATIVE EXAMPLE 22

The same procedure as in Example 8 was repeated with the exception that the starting solution was changed to a mixture of 1.0 part by weight of the rubber-like polymer used in Example 8, 59.3 parts by weight of styrene, 19.7 parts by weight of acrylonitrile and 20.0 parts by weight of ethylbenzene. In this operation, although the rubber particles having a small size were formed and no huge particles were observed in the product resin, its rubber content was so low that its impact strength was too low as a ABS resin.

TABLE 3

| | | Example | | | | | | | | |
|---|---|---|---|---|---|---|---|---|---|---|
| | Unit | 8 | 9 | 10 | 11 | 12 | 13 | 14 | 15 | 16 |
| Starting solution | | | | | | | | | | |
| Polybutadiene | Parts by weight | 6.0 | 6.0 | 6.0 | 6.0 | 6.0 | 6.0 | 8.0 | 6.0*1 | 6.0 |
| Styrene/acrylonitrile | Parts by weight | 55.5/18.5 | 55.5/18.5 | 55.5/18.5 | 55.5/18.5 | 55.5/18.5 | 55.5/18.5 | 54.0/18.0 | 55.5/18.5 | 55.5/18.5 |
| Ethylbenzene | Parts by weight | 20.0 | 20.0 | 20.0 | 20.0 | 20.0 | 20.0 | 20.0 | 20.0 | 20.0 |
| Radical polymerization initiator | Parts by weight | 0.02 | 0.02 | 0.02 | 0.02 | 0.02 | 0.02 | 0.02 | 0.02 | 0.04*2 |
| Feeding rate of starting solution $F_1$ | l/hr | 15.0 | 15.0 | 15.0 | 15.0 | 15.0 | 15.0 | 15.0 | 15.0 | 15.0 |
| 1st reactor | | | | | | | | | | |
| Volume | l | 18.0 | 18.0 | 18.0 | 18.0 | 18.0 | 18.0 | 18.0 | 18.0 | 18.0 |
| Reaction temperature | °C. | 110 | 110 | 110 | 110 | 110 | 107 | 108 | 110 | 105 |
| Revolution number of stirrer | rps | 1.5 | 1.5 | 1.5 | 1.5 | 1.5 | 1.5 | 1.5 | 1.5 | 1.5 |
| Conversion of monomer at exit | % | 22.0 | 22.0 | 22.0 | 22.0 | 22.0 | 19.3 | 21.8 | 23.1 | 21.2 |
| Concentration of polymerized monomer in reaction solution at exit $x_2$ | wt. % | 16.3 | 16.3 | 16.3 | 16.3 | 16.3 | 14.3 | 15.7 | 17.1 | 15.7 |
| Flow rate in circulation line $F_2$ | l/hr. | 120 | 180 | 60 | 120 | 120 | 120 | 120 | 120 | 120 |
| Particle disperser | | | | | | | | | | |
| Volume $V_2$ | l | 0.96 | 0.96 | 0.96 | 0.96 | 0.96 | 0.96 | 0.96 | 0.96 | 0.96 |
| Outside diameter of circulation paddle d | m | 0.08 | 0.08 | 0.08 | 0.08 | 0.08 | 0.08 | 0.08 | 0.08 | 0.08 |
| Revolution number of circulation paddle n | rps | 16.7 | 16.7 | 16.7 | 25.0 | 8.3 | 16.7 | 16.7 | 16.7 | 16.7 |
| Peripheral linear velocity of circulation paddle v | m/sec | 4.2 | 4.2 | 4.2 | 6.3 | 2.1 | 4.2 | 4.2 | 4.2 | 4.2 |
| $V_2/V_1$ | | 0.053 | 0.053 | 0.053 | 0.053 | 0.053 | 0.053 | 0.053 | 0.053 | 0.053 |
| $F_2/F_1$ | | 8.0 | 12.0 | 4.0 | 8.0 | 8.0 | 8.0 | 8.0 | 8.0 | 8.0 |
| 2nd reactor | | | | | | | | | | |
| Reaction temperature | °C. | 110 | 110 | 110 | 110 | 110 | 110 | 110 | 110 | 110 |
| Conversion of monomer | % | 33.8 | 33.8 | 33.8 | 33.8 | 33.8 | 32.1 | 34.5 | 34.2 | 35.0 |
| Product | | | | | | | | | | |
| Average size of rubber particles | μ | 0.5 | 0.5 | 0.7 | 0.5 | 0.9 | 0.5 | 0.7 | 0.5 | 0.5 |
| Number of fish-eyes | 1/1000 cm² | 0 | 0 | 0 | 0 | 0 | 0 | 0 | 0 | 0 |

TABLE 3-continued

| | Unit | Example 8 | 9 | 10 | 11 | 12 | 13 | 14 | 15 | 16 |
|---|---|---|---|---|---|---|---|---|---|---|
| Surface gloss | % | 78 | 79 | 70 | 82 | 62 | 80 | 68 | 79 | 79 |

*[1] Toughdene 2000A was used.
*[2] LPO was used.

TABLE 4

| | | Unit | Comparative Example 10 | 11 | 12 | 13 | 14 | 15 | 16 | 17 | 18 | 19 | 20 | 21 | 22 |
|---|---|---|---|---|---|---|---|---|---|---|---|---|---|---|---|
| Starting solution | | | | | | | | | | | | | | | |
| Polybutadiene | | Parts by weight | 6.0 | 6.0 | 6.0 | 6.0 | 6.0 | 6.0 | 6.0 | 6.0 | 6.0*[1] | 6.0 | 6.0 | 16.0 | 1.0 |
| Styrene/acrylonitrile | | Parts by weight | 55.5/18.5 | 55.5/18.5 | 55.5/18.5 | 55.5/18.5 | 55.5/18.5 | 55.5/18.5 | 55.5/18.5 | 29.6/44.4 | 55.5/18.5 | 55.5/18.5 | 55.5/18.5 | 48.0/16.0 | 59.3/19.7 |
| Ethylbenzene | | Parts by weight | 20.0 | 20.0 | 20.0 | 20.0 | 20.0 | 20.0 | 20.0 | 20.0 | 20.0 | 20.0 | 20.0 | 20.0 | 20.0 |
| Radical polymerization initiator | | Parts by weight | 0.02 | 0.02 | 0.02 | 0.02 | 0.02 | 0.02 | 0.02 | 0.02 | 0.02 | 0.04*[2] | 0 | 0.02 | 0.02 |
| Feeding rate of starting solution | $F_1$ | l/hr. | 15.0 | 15.0 | 15.0 | 15.0 | 15.0 | 15.0 | 15.0 | 15.0 | 15.0 | 15.0 | 15.0 | 15.0 | 15.0 |
| 1st reactor | | | | | | | | | | | | | | | |
| Volume | $V_1$ | l | 18.0 | 18.0 | 18.0 | 18.0 | 18.0 | 18.0 | 18.0 | 18.0 | 18.0 | 18.0 | 18.0 | 18.0 | 18.0 |
| Reaction temperature | | °C. | 110 | 110 | 110 | 110 | 103 | 95 | 123 | 110 | 110 | 126 | 130 | 110 | 110 |
| Revolution number of stirrer | | rps | 1.5 | 6.0 | 1.5 | 1.5 | 1.5 | 1.5 | 1.5 | 1.5 | 1.5 | 1.5 | 1.5 | 1.5 | 1.5 |
| Conversion of monomer at exit | | % | 22.0 | 22.5 | 22.0 | 22.0 | 16.2 | 9.8 | 35.1 | 24.3 | 24.6 | 23.2 | 22.7 | — | 21.1 |
| Concentration of polymerized monomer in reaction solution at exit | $x_2$ | wt. % | 16.3 | 16.7 | 16.3 | 16.3 | 12.0 | 7.3 | 26.0 | 18.0 | 18.2 | 17.2 | 16.8 | — | 16.7 |
| Flow rate in circulation line | $F_2$ | l/hr. | | 120 | 120 | 120 | 120 | 120 | 120 | 120 | 120 | 120 | | 120 |
| Particle disperser | | | | | | | | | | | | | | | |
| Volume | $V_2$ | l | | 0.96 | 9.7 | 0.96 | 0.96 | 0.96 | 0.96 | 0.96 | 0.96 | 0.96 | | 0.96 |
| Outside diameter of circulation paddle | d | m | | 0.08 | 0.4 | 0.08 | 0.08 | 0.08 | 0.08 | 0.08 | 0.08 | 0.08 | | 0.08 |
| Revolution number of circulation paddle | n | rps | | 1.67 | 3.3 | 16.7 | 16.7 | 16.7 | 16.7 | 16.7 | 16.7 | 16.7 | | 16.7 |
| Peripheral linear velocity of circulation paddle | v | m/sec | | 0.42 | 4.1 | 4.2 | 4.2 | 4.2 | 4.2 | 4.2 | 4.2 | 4.2 | | 4.2 |
| $V_2/V_1$ | | — | | 0.053 | 0.54 | 0.053 | 0.053 | 0.053 | 0.053 | 0.053 | 0.053 | 0.053 | | 0.053 |
| $F_2/F_1$ | | — | | 8.0 | 8.0 | 8.0 | 8.0 | 8.0 | 8.0 | 8.0 | 8.0 | 8.0 | | 8.0 |
| 2nd reactor | | | | | | | | | | | | | | | |
| Reaction temperature | | °C. | 110 | 110 | 110 | 110 | 100 | 120 | 110 | 110 | 110 | 130 | 135 | | 110 |
| Conversion of monomer | | % | 32.1 | 33.1 | 34.0 | 38.8 | 20.2 | 23.1 | 41.2 | 35.5 | 35.0 | 38.5 | 36.1 | | 32.5 |
| Product | | | | | | | | | | | | | | | |
| Average size of rubber particles | | μ | 2.7 | 0.7 | 1.2 | 1.5 | 0.7 | 3.4 | 1.5 | 0.08 | 1.9 | 1.5 | 1.8 | — | 0.4 |
| Number of fish-eyes | | /1000 cm² | 12 | 0 | 3 | 5 | 3 | 38 | 3 | 0 | 13 | 2 | 5 | — | 0 |
| Surface gloss | | % | 10 | 72 | 46 | 37 | 66 | 7 | 35 | 65 | 19 | 37 | 25 | — | 89 |

*[1] Diene 55A was used
*[2] Ditertiary butyl peroxide was used.

EXAMPLE 17

A starting solution was obtained by dissolving 6.0 parts by weight of polybutadiene (Diene 55, trade name, a product of Asahi Kasei Corporation) in a starting monomer consisting of 79.0 parts by weight of styrene and 15.0 parts by weight of ethyl benzene as a solvent. After adding 0.1 part by weight of 2,6-ditertiarybutyl phenol as an antioxidant into the starting solution, the starting solution was continuously supplied at a feeding rate of 13.0 l/hr. ($F_1$) into the same first reactor as used in Example 1. The polymerization in the first reactor was conducted at a temperature of 130° C. with a revolution number of the stirring blade at 1.5 rps. The phase transfer of the rubber-like polymer was performed, thereby the particles of the rubber-like polymer were formed in the reaction liquid. The reacting liquid at the exit of the first reactor had 6.0% by weight of the rubber-like polymer ($X_1$) and 20.8% by weight of polystyrene ($X_2$) formed from the starting monomer (26.3% by weight as the proportion of the polymerized monomer to the starting monomer).

The reaction liquid was continuously taken out of the first reactor and was fed into a particle disperser, and was treated therein. The particle disperser used had an inner volume of 0.48 l ($V_2$), a stirrer composed of six paddle combinations on a rotatable shaft, each of which has four stirring paddles radially arranged and having a outside diameter (d) of 0.05 m, and circular plates existing between the respective combinations of the paddles and equipped so as to rotate simultaneously together with the shaft for the rotatable paddles. The stirrer was operated at a revolution number (n) of 16.7 rps (1000 rpm). In these operating conditions, the ratio of the inner volumes of the particle disperser and the first reactor, $V_2/V_1$, is 0.019, and the circumferential linear velocities of the respective stirring blades in the particle disperser is 2.6 m/sec.

Then, the reaction liquid treated in the particle disperser was continuously fed to the second full-fill type reactor which has an inner volume of 10.2 l and a screw type stirring blade with a draught pipe, and the polymerization was continued. The polymerization in the second reactor was conducted at a reaction temperature of 130° C. under a stirring blade revolution number of 1.0 rps.

The reaction liquid in the second reactor was maintained at 34.1% by weight in the proportion of the polymerized monomer to the starting monomer. The reaction liquid polymerized in the second reactor was continuously taken out of the reactor, and was supplied into the following third, fourth and fifth reactors, which were maintained at exit temperatures of 140° C., 150° C. and 160° C., respectively, and had a tower-like form without any stirrer and polymerization was continued. The reaction liquid was continuously taken out of the fifth reactor and then separated from the unpolymerized monomer and the solvent at a high temperature under high vacuum by using a well known apparatus for removing volatile materials, and was finally pelletized by using an extruder to obtain the product of HI-PS resin.

The average particle size of the rubber particles in the product resin thus obtained was measured as the volume average value on the basis of their photograph obtained by using an electron microscope. In addition, a part of the product resin was extruded as a film of 0.1 mm thickness, the film was examined by counting the fish-eyes having an area of 0.2 mm$^2$ or more. The same evaluation methods as described above were also employed in the following Examples and Comparative Examples. The results of these evaluations are shown in Tables 5 and 6.

EXAMPLES 18 AND 19

The same procedure as in Example 17 was repeated with the exception that the revolution number of the stirrer of the particle disperser was changed.

EXAMPLE 20

The same procedure as in Example 17 was repeated with the exception that the reaction temperature in the first reactor was changed to 127° C.

EXAMPLE 21

The same procedure as in Example 20 was repeated with the exception that the amount of polybutadiene in the starting solution was changed to 9.0 parts by weight, and the amount of ethylbenzene was changed to 12.0 parts by weight, and the stirring conditions in the first reactor and particle disperser were changed as shown in Table 5.

EXAMPLE 22

The same procedure as in Example 17 was repeated with the exception that, as the particle disperser, there was used a stirring and mixing machine which was constituted of three stage stirrers having a common rotatable shaft equipped through three stirring chambers successively arranged along the flow path of the reaction liquid, each of which stirrers was composed of coaxially arranged two layer combinations consisting of a cylindrical rotor and comb-like stator cut at their respective ends. This stirring and mixing machine has six combinations composed of the rotor and stator. The inner volume of the particle disperser was 0.24 l ($V_2$). With regard to the rotors in each stage, the outside rotor of the two combinations each composed of a rotor and stator had a outside diameter (do) of 0.055 m, and the inside rotor has a diameter (di) of 0.04 m, and any gap between the rotor and stator adjacent each other has a gap length of 0.001 m (h). The rotor in this particle disperser was operated at a revolution number of 8.3 rps (500 rpm). In this Example, the ratio of the inner volume of the particle disperser to the inner volume of the first reactor, $V_2/V_1$, is 0.010, the circumferential linear velocity of each outside rotor in the particle disperser is 1.44 m/sec. (vo), and that of each inside rotor is 1.05 m (vi), and the relationships v/h of the circumferential velocities to the gap length between the rotor and stator are vo/h=1440 for the outside rotor and vi/h=1050 for the inside rotor.

EXAMPLES 23 AND 24

The same procedure as in Example 22 was repeated with the exception that the revolution number of the rotor in the particle disperser was changed.

COMPARATIVE EXAMPLE 23

The same procedure as in Example 17 was repeated with the exception that the particle disperser between the first and second reactors was omitted. A large average size of the rubber particles and some huge rubber particles were observed.

COMPARATIVE EXAMPLE 24

The same procedure as in Comparative Example 23 was repeated with the exception that the revolution number of the stirring blade in the first reactor was changed to 4.5 rps (270 rpm). Although no huge particles were observed, the average size of the rubber particles became larger in comparison with that in the case of Example 17.

COMPARATIVE EXAMPLE 25

The same procedure as in Example 17 was repeated with the exception that the revolution number of the stirrer in the particle disperser was changed to 2.0 rps (120 rpm).

COMPARATIVE EXAMPLE 26

The same procedure as in Example 17 was repeated with the exception that there is used a particle disperser having an inner volume of 7.6 l and constituting of six paddle combinations, each of which is composed of four radially arranged paddles having an outside diameter (d) of 0.14 m, on a rotatable shaft, at a revolution number of 3.33 rps (200 rpm), in place of the particle disperser in Example 17.

COMPARATIVE EXAMPLE 27

The same procedure as in Example 17 was repeated with the exception that the reaction temperatures of the first and second reactors were changed so as to maintain the proportion of polymerized monomer to the starting monomer in the second reactor at a value of 25% by weight or lower.

COMPARATIVE EXAMPLE 28

The same procedure as in Example 17 was repeated with the exception that the reaction temperature of the first reactor was changed to 110° C. In this case, the concentration of the polymer formed from the starting monomer in the first reactor was not increased sufficiently so that no phase transfer of the rubber-like polymer occurred in the first reactor, and the reaction solution in a the first reactor remained in uniform phase. Even after treating the reaction liquid in the particle disperser, no rubber particle was formed. After raising the temperature of the second reactor, the formation of the rubber particles was observed.

COMPARATIVE EXAMPLE 29

The same procedure as in Example 17 was repeated with the exception that the reaction temperature of the first reactor was changed to 138° C. In this case, the concentration of the polymer formed from the starting monomer in the first reactor was too high so that the rubber particles formed in the first reactor were excessively large and some huge particles were observed in these rubber particles. After treating the reaction liquid with the particle disperser, the average particle size of the rubber particles thus obtained was larger in comparison with that obtained in Example 17, and a few huge rubber particles were observed.

COMPARATIVE EXAMPLE 30

The same procedure as in Example 17 was repeated with the exception that the composition of the starting solution was changed as shown in Table 6 and 1.0% by weight of polybutadiene was used. In this case, although no huge particles were observed and the rubber particles having a small average size were formed, the rubber content in the product thus obtained was too low so that the impact strength of the product resin was too low as a rubber modified high impact resin.

COMPARATIVE EXAMPLE 31

The same procedure as in Example 17 was repeated with the exception that the composition of the starting solution was changed as shown in Table 6 and 21.0% by weight of polybutadiene was used. In this case, the concentration of the rubber in the reaction liquid was too high so that no phase transfer occurred.

COMPARATIVE EXAMPLE 32

The same procedure as in Example 22 was repeated with the exception that the rotor in the particle disperser was operated at its revolution number of 1.67 rps (100 rpm).

COMPARATIVE EXAMPLE 33

The same procedure as in Example 22 was repeated with the exception that there is used a particle disperser which was similarly constituted to that of Example 22 but has only a stage stirrer composed of coaxially arranged two layer combinations of a cylindrical rotor and comb-like stator cut at their respective ends, by operating its rotor at a revolution number of 8.3 rps (500 rpm).

COMPARATIVE EXAMPLE 34

The same procedure as in Example 22 was repeated with the exception that there is used a particle disperser which had the same constitution as used in Example 22, but had a gap length (h) of 0.01 m for each gap between the rotor and stator, by operating its rotor at a revolution number of 8.3 rps (500 rpm).

TABLE 5

| | | Unit | Example 17 | 18 | 19 | 20 | 21 | 22 | 23 | 24 |
|---|---|---|---|---|---|---|---|---|---|---|
| Starting solution | | | | | | | | | | |
| Styrene | | Parts by weight | 79.0 | 79.0 | 79.0 | 79.0 | 79.0 | 79.0 | 79.0 | 79.0 |
| Ethylbenzene | | Parts by weight | 15.0 | 15.0 | 15.0 | 15.0 | 12.0 | 15.0 | 15.0 | 15.0 |
| Polybutadiene | | Parts by weight | 6.0 | 6.0 | 6.0 | 6.0 | 9.0 | 6.0 | 6.0 | 6.0 |
| Feeding rate of starting solution | $F_1$ | l/hr. | 13.0 | 13.0 | 13.0 | 13.0 | 13.0 | 13.0 | 13.0 | 13.0 |
| 1st reactor | | | | | | | | | | |
| Volume | $V_1$ | l | 24.9 | 24.9 | 24.9 | 24.9 | 24.9 | 24.9 | 24.9 | 24.9 |
| Reaction temperature | | °C. | 130 | 130 | 130 | 127 | 127 | 130 | 130 | 130 |
| Revolution number of stirrer | | rps | 1.5 | 1.5 | 1.5 | 1.5 | 2.0 | 1.5 | 1.5 | 1.5 |
| Conversion of monomer at exit | | % | 26.3 | 26.3 | 26.3 | 22.2 | 24.5 | 26.3 | 26.3 | 26.3 |
| Concentration of polymerized monomer in reaction solution at exit | $x_2$ | wt. % | 20.8 | 20.8 | 20.8 | 17.5 | 19.4 | 20.8 | 20.8 | 20.8 |
| Particle disperser | | | | | | | | | | |
| Number of combinations of shearing blades or rotors | | — | 6 | 6 | 6 | 6 | 6 | 6*1 | 6 | 6 |
| Inner volume | $V_2$ | l | 0.48 | 0.48 | 0.48 | 0.48 | 0.48 | 0.24 | 0.24 | 0.24 |
| Outside diameter of blades or rotors | d | m | 0.05 | 0.05 | 0.05 | 0.05 | 0.05 | 0.055, 0.04 | 0.055, 0.04 | 0.055, 0.04 |
| Revolution number of blades or rotors | n | rps | 16.7 | 25.0 | 8.3 | 16.7 | 25.0 | 8.3 | 16.7 | 5.0 |
| Peripheral linear velocity of blades or rotors | v | m/sec | 2.6 | 3.9 | 1.3 | 2.6 | 3.9 | 1.4, 1.1 | 2.9, 2.1 | 0.86, 0.63 |
| $V_2/V_1$ | | — | 0.027 | 0.027 | 0.027 | 0.027 | 0.027 | 0.010 | 0.010 | 0.010 |
| v/h (rotor/stator type) | | 1/sec | — | — | — | — | — | 1440, 1050 | 2880, 2090 | 860, 630 |
| 2nd reactor | | | | | | | | | | |
| Reaction temperature | | °C. | 130 | 130 | 130 | 130 | 130 | 130 | 130 | 130 |
| Conversion of monomer | | % | 34.1 | 34.1 | 34.1 | 33.1 | 37.6 | 33.5 | 33.5 | 33.5 |
| Product | | | | | | | | | | |
| Average size of rubber particles | | μ | 0.8 | 0.7 | 1.3 | 0.8 | 1.1 | 0.7 | 0.7 | 0.9 |
| Number of fish-eyes | | /1000 cm² | 0 | 0 | 0 | 0 | 0 | 0 | 0 | 0 |

*1 Combinations of a cylindrical rotor and stator each of which is cut comb-likely at its ends are used as the shearing blades of the shearing stirrer in the particle disperser.

with the exception that the composition of the starting

TABLE 6

| | | Comparative Example | | | | | | | | | | | |
|---|---|---|---|---|---|---|---|---|---|---|---|---|
| | Unit | 23 | 24 | 25 | 26 | 27 | 28 | 29 | 30 | 31 | 32 | 33 | 34 |
| Starting solution | | | | | | | | | | | | | |

TABLE 6-continued

| | Unit | Comparative Example 23 | 24 | 25 | 26 | 27 | 28 | 29 | 30 | 31 | 32 | 33 | 34 |
|---|---|---|---|---|---|---|---|---|---|---|---|---|---|
| Styrene | Parts by weight | 79.0 | 79.0 | 79.0 | 79.0 | 79.0 | 79.0 | 79.0 | 84.0 | 64.0 | 79.0 | 79.0 | 79.0 |
| Ethylbenzene | Parts by weight | 15.0 | 15.0 | 15.0 | 15.0 | 15.0 | 15.0 | 15.0 | 15.0 | 15.0 | 15.0 | 15.0 | 15.0 |
| Polybutadiene | Parts by weight | 6.0 | 6.0 | 6.0 | 6.0 | 6.0 | 6.0 | 6.0 | 1.0 | 21.0 | 6.0 | 6.0 | 6.0 |
| Feeding rate of starting solution | l/hr. | 13.0 | 13.0 | 13.0 | 13.0 | 13.0 | 13.0 | 13.0 | 13.0 | 13.0 | 13.0 | 13.0 | 13.0 |
| 1st reactor | | | | | | | | | | | | | |
| Volume | $V_1$ l | 24.9 | 24.9 | 24.9 | 24.9 | 24.9 | 24.9 | 24.9 | 24.9 | 24.9 | 24.9 | 24.9 | 24.9 |
| Reaction temperature | °C. | 130 | 130 | 130 | 127 | 124 | 110 | 138 | 130 | 130 | 130 | 130 | 130 |
| Revolution number of stirrer | rps | 1.5 | 4.5 | 1.5 | 1.5 | 1.5 | 1.5 | 1.5 | 1.5 | 1.5 | 1.5 | 1.5 | 1.5 |
| Conversion of monomer at exit | wt. % | 26.3 | 27.0 | 26.3 | 26.3 | 19.6 | 8.8 | 35.0 | 26.6 | 25.0 | 26.3 | 26.3 | 26.3 |
| Concentration of polymerized monomer in reaction solution at exit | $x_2$ wt. % | 20.8 | 21.3 | 20.8 | 20.8 | 15.5 | 7.0 | 27.0 | 22.3 | 16.3 | 20.8 | 20.8 | 20.8 |
| Particle disperser | | | | | | | | | | | | | |
| Number of combinations of shearing blades or rotors | — | — | 6 | 6 | 6 | 6 | 6 | 6 | | | 6*1 | 2*1 | 6*1 |
| Inner volume | $V_2$ l | | 0.48 | 7.6 | 0.48 | 0.48 | 0.48 | 0.48 | | | 0.24 | 0.24 | 0.24 |
| Outside diameter of blades or rotors | d m | | 0.05 | 0.14 | 0.05 | 0.05 | 0.05 | 0.05 | | | 0.055, 0.04 | 0.055, 0.04 | 0.055, 0.04 |
| Revolution number of blades or rotors | n rps | | 2 | 3.33 | 16.7 | 1.67 | 16.7 | 16.7 | | | 1.67 | 8.3 | 8.3 |
| Peripheral linear velocity of blades or rotors | v m/sec | | 0.31 | 1.47 | 2.6 | 2.6 | 2.6 | 2.6 | | | 0.29, 0.21 | 1.4, 1.1 | 1.4, 1.1 |
| $V_2/V_1$ | — | | 0.027 | 0.42 | 0.027 | 0.027 | 0.027 | 0.027 | | | 0.010 | 0.013 | 0.010 |
| v/h (rotor/stator type) | l/sec | — | — | — | — | — | — | | | | 288, 209 | 1440, 1050 | 144, 105 |
| 2nd reactor | | | | | | | | | | | | | |
| Reaction temperature | °C. | 130 | 130 | 130 | 130 | 120 | 140 | 130 | 130 | | 130 | 130 | 130 |
| Conversion of monomer | wt. % | 33.3 | 33.9 | 34.2 | 38.1 | 23.5 | 21.6 | 40.2 | 36.2 | | 33.5 | 33.6 | 33.5 |
| Product | | | | | | | | | | | | | |
| Average of rubber particles | μ | 3.4 | 1.5 | 2.3 | 1.7 | 1.4 | 4.6 | 1.5 | 0.6 | | 1.8 | 1.6 | 1.6 |
| Number of fish-eyes | /1000 cm² | 28 | 0 | 4 | 4 | 2 | 38 | 5 | 0 | | 0 | 0 | 0 |

*1 Combinations of a cylindrical rotor and stator each of which is cut comb-like at its ends are used as the shearing blades of the shearing stirrer in the particle disperser.

EXAMPLE 25

A starting solution was obtained by dissolving 6.0 parts by weight of polybutadiene (Asaprene 700A, trade name, a product of Asahi Kasei Corporation) in a starting monomer consisting of 55.5 parts by weight of styrene, 18.5 parts by weight of acrylonitrile (ratio of styrene to acrylonitrile is 75/25) and 20.0 parts by weight of ethylbenzene. The Asaprene 700A solution of 5% by weight in styrene has a viscosity of 45 centipoises at 25° C. After adding 0.2 part by weight of tertiarydodecylmercaptan as molecular weight adjusting agent, 0.02 part by weight of benzoyl peroxide (BPO: its decomposition temperature corresponding to the half-life period of ten hours is 74° C.) as radical polymerization initiator and 0.2 part by weight of 2,6-ditertiarybutyl phenol as antioxidant to the starting solution, the starting solution was continuously supplied into the same first reactor as used in Example 8 at a feeding rate of 15.0 l/hr ($F_1$). The polymerization reaction in the first reactor was conducted at a temperature of 110° C. with a revolution number of the stirring blade at 1.5 rps. The phase transfer of the rubber-like polymer was performed, thereby the particles of the rubber-like polymer were formed in the reaction liquid. The reaction liquid at the exit of the first reactor had 6.0% by weight of the rubber-like polymer content ($X_1$) and 16.4% by weight of the polymer content formed from the starting monomer ($X_2$) (conversion: 22.2%).

The reaction liquid was continuously taken out of the first reactor and was fed to a particle disperser, and was treated thereat. As the particle disperser, the same one as used in Example 17 was employed. The stirring paddles in the particle disperser was operated at a revolution number (n) of 16.7 rps (1000 rpm). In this operating conditions, the ratio of the inner volume of the particle disperser to that of the first reactor, $V_2/V_1$, is 0.027, and the circumferential linear velocity of the stirring blades is 2.6 m/sec.

The reaction liquid treated in the particle disperser was then fed continuously into the second full-fill type reactor having an inner voluem of 10.2 l and a screw type stirrer with a draught pipe, and the polymerization reaction was continued. The polymerization in the second reactor was conducted at a reaction temperature of 110° C. at revolution number of stirrer of 1.0 rps. In the second reactor, the conversion of the monomer was 33.2%.

The reaction liquid polymerized in the second reactor was continuously taken out of the reactor and was supplied into the following third, fourth and fifth reactors, each of which was equipped with the same screw type stirring blade and the same draught pipe as used in the first and polymerization second reactors, and was continued at a temperature of 110° C., 120° C. and 130° C., respectively. The reaction liquid was continuously taken out of the fifth reactor, and then separated from the unpolymerized monomer and the solvent at a high temperature under high vacuum by using a well known apparatus for removing volatile materials, and was finally pelletized by using an extruder to obtain the product of ABS resin proposed.

The average particle size of the rubber particles in the product thus obtained was measured as the volume average value on the basis of their photograph obtained by using an electron microscope. In addition, a part of the product was extruded as a film of 0.1 mm thickness, the film was examined by numbering fish-eyes having an area of 0.2 mm² or larger. Further, a test piece was made by using an injection molding machine of 4 oz. and the surface gloss of the test piece was measured by using an incidence angle of 60° in accordance with the method of JIS Z-8741. The operation conditions and the results of these measurements are shown in Table 7. The results of such evaluations for the following Examples and Comparative Examples are also shown in Table 7 and 8 respectively.

EXAMPLES 26 AND 27

The same procedure as in Example 25 was repeated with the exception that the revolution number of the stirrer in the particle disperser was changed.

EXAMPLE 28

The same procedure as in Example 25 was repeated with the exception that the reaction temperature in the first reactor was changed to 107° C.

EXAMPLE 29

The same procedure as in Example 25 was repeated with the exception that the amount of polybutadiene in the starting solution was changed to 8.0 parts by weight, and the amounts of styrene and acrylonitrile used and the reaction temperature in the first reactor were changed as shown in Table 7.

EXAMPLE 30

The same procedure as in Example 25 was repeated with the exception that a styrene-butadiene copolymer (Toughdene 2000A, trade name, a product of Asahi Kasei Corporation, the viscosity of its 5% solution in styrene is 50 centipoises at 25° C.) was used as the rubber-like polymer in the starting solution.

EXAMPLE 31

The same procedure as in Example 25 was repeated with the exception that lauroyl peroxide (LPO) whose decomposition temperature corresponding to a half-life period of ten hours is 62° C., was used in an amount of 0.04 part by weight as the radical polymerization initiator in place of benzoyl peroxide, and the polymerization temperature in the first reactor was changed to 105° C.

EXAMPLE 32

The same procedure as in Example 25 was repeated with the exception that, as the particle disperser, there was used a stirring and mixing machine comprising three staged stirrers which are arranged successively on a common rotatable shaft equipped through three stirring chambers arranged successively along the flow path of the reaction liquid, and each of which stirrers was installed in respective chambers and was constituted of coaxially arranged two layer-like combinations each composing of a coaxially arranged cylindrical rotor and comb-like stator cut at their respective ends. This stirring and mixing machine had six combinations each composed of the rotor and stator. The inner volume of the particle disperser was 0.24 l ($V_2$). With regard to the rotors in each stage, the outside rotor of the two coaxially arranged combinations each composed of a rotor and stator had a outside diameter (do) of 0.055 m, and the corresponding inside rotor has a outside diameter (di) of 0.04 m, and any gap between the rotor and stator adjacent each other has a gap length of 0.001 m (h). The rotor in this particle disperser was operated at a revolution number of 8.3 rps (500 rpm). In this Example, the ratio of the inner volume of the particle disperser to the inner volume of the first reactor, $V_2/V_1$, is 0.013, the circumferential linear velocity of each outside rotor in the particle disperser is 1.44 m/sec (vo), and that of each inside rotor is 1.05 m (vi), and the v/h relationships of the circumferential velocities to the gap length between the rotor and stator are vo/h=1440 for the outside rotor and vi/h=1050 for the inside rotor.

EXAMPLES 33 AND 34

The same procedure as in Example 32 was repeated with the exception that the revolution number of the rotor in the particle disperser was changed.

COMPARATIVE EXAMPLE 35

The same procedure as in Example 25 was repeated with the exception that the particle disperser between the first and second reactors was omitted. A larger average size of the rubber particles and some huge rubber particles were observed.

COMPARATIVE EXAMPLE 36

The same procedure as in Comparative Example 35 was repeated with the exception that the revolution number of the stirring blade in the first reactor was changed to 6.0 rps (360 rpm). Although a no huge particles were observed, the average size of the rubber particles became larger in comparison with that in the case of Example 25.

COMPARATIVE EXAMPLE 37

The same procedure as in Example 25 was repeated with the exception that the revolution number of the stirrer in the particle disperser was changed to 2.0 rps (120 rpm).

COMPARATIVE EXAMPLE 38

The same procedure as in Example 25 was repeated with the exception that the same particle disperser as used in Comparative Example 26 was used at a revolution number of its rotor of 3.33 rps (200 rpm) in place of the particle disperser used in Example 25.

COMPARATIVE EXAMPLE 39

The same procedure as in Example 25 was repeated with the exception that the reaction temperatures of the first and second reactors were changed to reaction conditions (see Table 8) so as to maintain the proportion of polymerized monomer to the starting monomer in the second reactor at a value of 25% by weight or lower.

COMPARATIVE EXAMPLE 40

The same procedure as in Comparative Example 39 was repeated with the exception that the reaction temperature of the first reactor was changed to 95° C. In this case, the concentration of the polymer formed from the starting monomer in the first reactor was not increased sufficiently so that no phase transfer of the rubber-like polymer occurred in the first reactor, and the reaction liquid in the first reactor remained in a uniform phase. Even after treating the reaction liquid in the particles were disperser, no rubber particle was formed. After raising the temperature of the second reactor at 120° C., the formation of the rubber particles was observed.

COMPARATIVE EXAMPLE 41

The same procedure as in Example 25 was repeated with the exception that the reaction temperature of the first reactor was changed to 123° C. In this case, the concentration of the polymer formed from the starting monomer in the first reactor was too high so that the rubber particles formed in the first reactor were excessively large and some huge particles were observed in these rubber particles. After treating the reaction liquid with the particle disperser, the average particle size of the rubber particles thus obtained was larger in comparison with that obtained in Example 25, and a few huge rubber particles were observed

COMPARATIVE EXAMPLE 42

The same procedure as in Example 25 was repeated with the exception that the weight ratio of styrene to acrylonitrile was changed to 40/60 (29.6 parts by weight of styrene and 44.4 parts by weight of acrylonitrile) and the amount of tertiarydodecylmercaptan was also changed to 0.3 part by weight. The ABS resin thus obtained was lowered in its surface gloss and its flowability became inferior.

COMPARATIVE EXAMPLE 43

The same procedure as in Example 25 was repeated with the exception that a high viscosity polybutadiene (Diene 55A, trade name, a product of Asahi Kasei Corporation, the viscosity of its 5% solution in styrene is 160 centipoises at 25° C.) was used as the rubber-like polymer in place of polybutadiene in Example 25. The average particle size in the product resin thus obtained became large, and its surface gloss became also inferior.

COMPARATIVE EXAMPLE 44

The same procedure as in Example 25 was repeated with the exception that ditertiarybutyl peroxide, of which the decomposition temperature corresponding to a half-life period of ten hours is 124° C., was used in an amount of 0.04 part by weight as the radical polymerization initiator in place of benzoyl peroxide, and the polymerization temperature in the first reactor was changed to 126° C. The product resin thus obtained has a large average particle size and inferior surface gloss.

COMPARATIVE EXAMPLE 45

The same procedure as in Example 25 was repeated with the exception that no radical polymerization initiator was used and the polymerization in the first reactor was performed thermally at a temperature of 130° C. The product resin thus obtained has a large average particle size and inferior surface gloss.

COMPARATIVE EXAMPLE 46

The same procedure as in Example 25 was repeated with the exception that the starting solution was changed to a mixture of 16.0 parts by weight of the rubber-like polymer, 48.0 parts by weight of styrene, 16.0 parts by weight of acrylonitrile and 20.0 parts by weight of ethylbenzene. In this operation, the concentration of the rubber-like polymer in the first reactor was too high so that the viscosity of the reaction liquid in the first reactor was remarkably increased to the state of a gel, and as the result, no normal product resin could be obtained.

COMPRATIVE EXAMPLE 47

The same procedure as in Example 25 was repeated with the exception that the starting solution was changed to a mixture of 1.0 part by weight of the rubber-like polymer, 59.3 parts by weight of styrene, 19.7 parts by weight of acrylonitrile and 20.0 parts by weight of ethylbenzene. Although no huge particles were observed and the rubber particles having a small average particle size were formed, the rubber content in the resin thus obtained was too low so that its impact strength was excessively low as a ABS resin.

COMPARATIVE EXAMPLE 48

The same procedure as in Example 32 was repeated with the exception that the revolution number of the rotor in the particle disperser was changed to 1.67 rps (100 rpm).

COMPARATIVE EXAMPLE 49

The same procedure as in Example 32 was repeated with the exception that there is used a particle disperser which was similarly constituted to that of Example 32 but has only a two stage stirrer composed of coaxially arranged two layer-like combinations each comprising a cylindrical rotor and comb-like stator cut at their respective ends, by operating its rotor at a revolution number of 8.3 rps (500 rpm).

COMPARATIVE EXAMPLE 50

The same procedure as in Example 32 was repeated with the exception that there is used a particle disperser which had the same constitution as used in Example 32, but had a gap length (h) of 0.01 m for each gap between the rotor and stator, by operating its rotor at a revolution number of 8.3 rps (500 rpm).

TABLE 7

| | | Unit | Example 25 | 26 | 27 | 28 | 29 | 30 | 31 | 32 | 33 | 34 |
|---|---|---|---|---|---|---|---|---|---|---|---|---|
| Starting solution | | | | | | | | | | | | |
| Polybutadiene | | Parts by weight | 6.0 | 6.0 | 6.0 | 6.0 | 8.0 | 6.0*1 | 6.0 | 6.0 | 6.0 | 6.0 |
| Styrene/acrylonitrile | | Parts by weight | 55.5/ 18.5 | 55.5/ 18.5 | 55.5/ 18.5 | 55.5/ 18.5 | 54.0/ 18.0 | 55.5/ 18.5 | 55.5/ 18.5 | 55.5/ 18.5 | 55.5/ 18.5 | 55.5/ 18.5 |
| Ethylbenzene | | Parts by weight | 20.0 | 20.0 | 20.0 | 20.0 | 20.0 | 20.0 | 20.0 | 20.0 | 20.0 | 20.0 |
| Radical polymerization initiator | | Parts by weight | 0.02 | 0.02 | 0.02 | 0.02 | 0.02 | 0.02 | 0.04*2 | 0.02 | 0.02 | 0.02 |
| Feeding rate of starting solution | $F_1$ | l/hr | 15.0 | 15.0 | 1.50 | 15.0 | 15.0 | 15.0 | 15.0 | 15.0 | 15.0 | 15.0 |
| 1st reactor | | | | | | | | | | | | |
| Volume | $V_1$ | l | 18.0 | 18.0 | 18.0 | 18.0 | 18.0 | 18.0 | 18.0 | 18.0 | 18.0 | 18.0 |
| Reaction temperature | | °C. | 110 | 110 | 110 | 107 | 110 | 110 | 105 | 110 | 110 | 110 |
| Revolution number of stirrer | | rps | 1.5 | 1.5 | 1.5 | 1.5 | 1.5 | 1.5 | 1.5 | 1.5 | 1.5 | 1.5 |
| Conversion of monomer at exit | | % | 22.2 | 22.2 | 22.2 | 19.5 | 23.5 | 23.0 | 21.2 | 22.2 | 22.2 | 22.2 |

TABLE 7-continued

|  | Unit | Example |  |  |  |  |  |  |  |  |  |
|---|---|---|---|---|---|---|---|---|---|---|---|
|  |  | 25 | 26 | 27 | 28 | 29 | 30 | 31 | 32 | 33 | 34 |
| Concentration of polymerized monomer in the reaction solution at exit | $x_2$ wt. % | 16.4 | 16.4 | 16.4 | 14.4 | 16.9 | 17.0 | 15.7 | 16.4 | 16.4 | 16.4 |
| Particle disperser |  |  |  |  |  |  |  |  |  |  |  |
| Rotor's number of blade | — | 6 | 6 | 6 | 6 | 6 | 6 | 6 | 6*3 | 6*3 | 6*3 |
| Inner volume | $V_2$  l | 0.48 | 0.48 | 0.48 | 0.48 | 0.48 | 0.48 | 0.48 | 0.24 | 0.24 | 0.24 |
| Outside diameter of rotor | d  m | 0.05 | 0.05 | 0.05 | 0.05 | 0.05 | 0.05 | 0.05 | 0.055, 0.04 | 0.055, 0.04 | 0.055, 0.04 |
| Revolution number of rotor | n  rps | 16.7 | 25.0 | 8.3 | 16.7 | 16.7 | 16.7 | 16.7 | 8.3 | 16.7 | 5.0 |
| Peripheral linear velocity of rotor | v  m/sec | 2.6 | 3.9 | 1.3 | 2.6 | 2.6 | 2.6 | 2.6 | 1.4, 1.1 | 2.9, 2.1 | 0.86, 0.63 |
| $V_2/V_1$ | — | 0.027 | 0.027 | 0.027 | 0.027 | 0.027 | 0.027 | 0.027 | 0.013 | 0.013 | 0.013 |
| v/h (rotor/stator type) | l/sec | — | — | — | — | — | — | — | 1440, 1050 | 2880, 2090 | 860, 630 |
| 2nd reactor |  |  |  |  |  |  |  |  |  |  |  |
| Reaction temperature | °C. | 110 | 110 | 110 | 110 | 110 | 110 | 110 | 110 | 110 | 110 |
| Conversion of monomer | % | 33.2 | 33.2 | 33.2 | 31.5 | 35.1 | 34.0 | 34.8 | 32.8 | 32.8 | 32.8 |
| Product |  |  |  |  |  |  |  |  |  |  |  |
| Average size of rubber particles | μ | 0.5 | 0.5 | 0.8 | 0.5 | 0.7 | 0.5 | 0.5 | 0.5 | 0.5 | 0.7 |
| Number of fish-eyes | 1/1000 cm² | 0 | 0 | 0 | 0 | 0 | 0 | 0 | 0 | 0 | 0 |
| Surface gloss | % | 77 | 81 | 62 | 80 | 67 | 78 | 77 | 78 | 76 | 68 |

*[1] Toughdene 2000A was used.
*[2] LPO was used.
*[3] Combinations of a cylindrical rotor and stator each of which is cut comb-likely at its ends are used as the shearing blades of the shearing stirrer in the particle disperser.

TABLE 8

|  |  | Comparative Example |  |  |  |  |  |  |  |
|---|---|---|---|---|---|---|---|---|---|
|  | Unit | 35 | 36 | 37 | 38 | 39 | 40 | 41 | 42 |
| Starting solution |  |  |  |  |  |  |  |  |  |
| Polybutadiene | Parts by weight | 6.0 | 6.0 | 6.0 | 6.0 | 8.0 | 6.0 | 6.0 | 6.0 |
| Styrene/acrylonitrile | Parts by weight | 55.5/18.5 | 55.5/18.5 | 55.5/18.5 | 55.5/18.5 | 55.5/18.5 | 55.5/18.5 | 55.5/18.5 | 29.6/44.4 |
| Ethylbenzene | Parts by weight | 20.0 | 20.0 | 20.0 | 20.0 | 20.0 | 20.0 | 20.0 | 20.0 |
| Radical polymerization initiator | Parts by weight | 0.02 | 0.02 | 0.02 | 0.02 | 0.02 | 0.02 | 0.02 | 0.02 |
| Feeding rate of starting solution | $F_1$  l/hr | 15.0 | 15.0 | 1.50 | 15.0 | 15.0 | 15.0 | 15.0 | 15.0 |
| 1st reactor |  |  |  |  |  |  |  |  |  |
| Volume | $V_1$  l | 18.0 | 18.0 | 18.0 | 18.0 | 18.0 | 18.0 | 18.0 | 18.0 |
| Reaction temperature | °C. | 110 | 110 | 110 | 110 | 103 | 95 | 123 | 110 |
| Revolution number of stirrer | rps | 1.5 | 6.0 | 1.5 | 1.5 | 1.5 | 1.5 | 1.5 | 1.5 |
| Conversion of monomer at exit | % | 22.2 | 22.2 | 22.2 | 22.2 | 16.0 | 9.6 | 34.7 | 24.3 |
| Concentration of polymerized monomer in the reaction solution at exit | $x_2$ wt. % | 16.4 | 16.7 | 16.4 | 16.4 | 11.8 | 7.1 | 25.7 | 18.0 |
| Particle disperser |  |  |  |  |  |  |  |  |  |
| Rotor's number of blade | — | — | 6 | 6 | 6 | 6 | 6 | 6 | 6 |
| Inner volume | $V_2$  l |  | 0.48 | 7.6 | 0.48 | 0.48 | 0.48 | 0.48 | 0.48 |
| Outside diameter of rotor | d  m |  | 0.05 | 0.14 | 0.05 | 0.05 | 0.05 | 0.05 | 0.05 |
| Revolution number of rotor | n  rps |  | 2.0 | 3.33 | 16.7 | 16.7 | 16.7 | 16.7 | 16.7 |
| Peripheral linear velocity of rotor | v  m/sec |  | 0.31 | 1.47 | 2.6 | 2.6 | 2.6 | 2.6 | 2.6 |
| $V_2/V_1$ | — |  | 0.027 | 0.42 | 0.027 | 0.027 | 0.027 | 0.027 | 0.027 |
| v/h (rotor/stator type) | l/sec |  | — | — | — | — | — | — | — |
| 2nd reactor |  |  |  |  |  |  |  |  |  |
| Reaction temperature | °C. | 110 | 110 | 110 | 110 | 100 | 120 | 110 | 110 |
| Conversion of monomer | % | 32.0 | 32.8 | 33.2 | 36.8 | 20.0 | 21.9 | 40.6 | 34.2 |
| Product |  |  |  |  |  |  |  |  |  |
| Average size of rubber particles | μ | 2.6 | 0.7 | 1.5 | 1.3 | 0.8 | 3.0 | 1.7 | 0.7 |
| Number of fish-eyes | 1/1000 cm² | 14 | 0 | 1 | 0 | 5 | 42 | 6 | 0 |
| Surface gloss | % | 13 | 70 | 41 | 47 | 64 | 8 | 32 | 68 |

|  |  | Comparative Example |  |  |  |  |  |  |  |
|---|---|---|---|---|---|---|---|---|---|
|  | Unit | 43 | 44 | 45 | 46 | 37 | 48 | 49 | 50 |
| Starting solution |  |  |  |  |  |  |  |  |  |
| Polybutadiene | Parts by weight | 6.0*1 | 6.0 | 6.0 | 16.0 | 1.0 | 6.0 | 6.0 | 6.0 |
| Styrene/acrylonitrile | Parts by weight | 55.5/18.5 | 55.5/18.5 | 55.5/18.5 | 4.8/16.0 | 59.3/19.7 | 55.5/18.5 | 55.5/18.5 | 55.8/18.5 |
| Ethylbenzene | Parts by weight | 20.0 | 20.0 | 20.0 | 20.0 | 20.0 | 20.0 | 20.0 | 20.0 |
| Radical polymerization initiator | Parts by weight | 0.02 | 0.04*4 | 0 | 0.02 | 0.02 | 0.02 | 0.02 | 0.02 |
| Feeding rate of starting solution | $F_1$  l/hr | 15.0 | 15.0 | 15.0 | 15.0 | 15.0 | 15.0 | 15.0 | 15.0 |
| 1st reactor |  |  |  |  |  |  |  |  |  |

TABLE 8-continued

| | | | | | | | | | | |
|---|---|---|---|---|---|---|---|---|---|---|
| Volume | $V_1$ | l | 18.0 | 18.0 | 18.0 | 18.0 | 18.0 | 18.0 | 18.0 | 18.0 |
| Reaction temperature | | °C. | 110 | 126 | 130 | 110 | 110 | 110 | 110 | 110 |
| Revolution number of stirrer | | rps | 1.5 | 1.5 | 1.5 | 1.5 | 1.5 | 1.5 | 1.5 | 1.5 |
| Conversion of monomer at exit | | % | 23.8 | 22.9 | 22.7 | — | 21.0 | 22.2 | 22.2 | 22.2 |
| Concentration of polymerized monomer in the reaction solution at exit | $x_2$ | wt. % | 17.6 | 16.9 | 16.8 | — | 16.6 | 16.4 | 16.4 | 16.4 |
| Particle disperser | | | | | | | | | | |
| Rotor's number of blade | | — | 6 | 6 | 6 | | 6 | 6[*3] | 2[*3] | 6[*3] |
| Inner volume | $V_2$ | l | 0.48 | 0.48 | 0.48 | | 0.48 | 0.24 | 0.32 | 0.24 |
| Outside diameter of rotor | d | m | 0.05 | 0.05 | 0.05 | | 0.05 | 0.055, 0.04 | 0.055, 0.04 | 0.055, 0.04 |
| Revolution number of rotor | n | rps | 16.7 | 16.7 | 16.7 | | 16.7 | 1.67 | 8.3 | 8.3 |
| Peripheral linear velocity of rotor | v | m/sec | 2.6 | 2.6 | 2.6 | | 2.6 | 0.29, 0.21 | 1.4, 1.1 | 1.4, 1.1 |
| $V_2/V_1$ | | — | 0.027 | 0.027 | 0.027 | | 0.027 | 0.013 | 0.018 | 0.013 |
| v/h (rotor/stator type) | | 1/sec | — | — | — | | — | 288, 209 | 1440, 1050 | 144, 105 |
| 2nd reactor | | | | | | | | | | |
| Reaction temperature | | °C. | 110 | 130 | 135 | | 110 | 110 | 110 | 110 |
| Conversion of monomer | | % | 33.8 | 38.6 | 35.3 | | 32.7 | 32.8 | 33.2 | 32.7 |
| Product | | | | | | | | | | |
| Average size of rubber particles | | μ | 2.0 | 1.5 | 1.9 | — | 0.4 | 1.2 | 0.8 | 1.0 |
| Number of fish-eyes | | 1/1000 cm² | 15 | 3 | 4 | — | 0 | 0 | 0 | 0 |
| Surface gloss | | % | 15 | 35 | 22 | — | 90 | 49 | 65 | 59 |

[*1] Dien 55A was used.
[*2] Ditertiary butyl oxide was used.
[*3] Combinations of a cylindrical rotor and stator each of which is cut comb-like at its ends are used as the shearing blades of the shearing stirrer in the particle disperser.

We claim:

1. In a process for continuously preparing rubber modified high impact resins which employs at least two polymerization reactors and a particle disperser and comprises the steps of (1) forming a starting solution obtained by dissolving a rubbery polymer in a starting monomer in which the rubber polymer is soluble, said starting monomer consisting of at least one aromatic vinyl monomer in an amount of from 47 to 99 parts by weight wherein the amounts of monomer(s) are based on a total amount of 100 parts by weight of the rubbery polymer, the starting monomer(s) and an organic solvent, if used, or a mixture of a radical polymerization initiator, at least one aromatic vinyl monomer and vinyl cyanide monomer with the ratio of aromatic vinyl monomer to cyanide monomer being 50:50 to 95:5, said starting monomer being continuously supplied into the first polymerization reactor; (2) conducting a polymerization reaction of the starting monomer in the first reactor so as to obtain a reaction liquid until the concentration of the polymer obtained by the polymerization, which concentration is required for converting the polymer into rubber particles dispersed in the reaction liquid, has been reached in the first reactor; (3) continuously removing the reaction liquid containing the particles of the rubbery polymer from the first reactor in an amount corresponding to the amount of the starting solution supplied into the first reactor; (4) feeding the reaction liquid taken out of the first reactor into a particle disperser, in which a shearing stirrer composed of rotatable agitator or cylindrical rotor is provided and rotated at high speed, for subjecting the particles of the rubbery polymer formed in the reaction liquid to the shearing treatment by the shearing stirrer in the particle disperser; (5) feeding the reaction liquid which has been subjected to the shearing treatment in the particle disperser into the second polymerization reactor in which the amount of the polymer formed from the starting monomer is maintained at a value of 25% or more as the conversion ratio of the starting monomer to the product, and continuing the polymerization reaction of the reaction liquid in the second reactor wherein the polymerizing reaction is conducted under conditions of (A) the following formula of $$V_2/V_1 < 0.2,$$

wherein $V_1$ is the volume occupied by the reaction liquid in the first reactor and $V_2$ is the inner volume of the particle disperser; (B) the peripheral linear velocity of the agitator or rotor being rotated is at a value of 0.5 meter per second or faster; and (C) the following formulas of $$1 < X_1 \leq 20$$

and $$1.5\, X_1 - 0.05\, X^2_1 < X_2 < 4.5\, X_1 - 0.05\, X^2_1$$

wherein $X_1$ is the proportion of the rubbery polymer to the reaction liquid at the exit of the first reactor by weight percent and $X_2$ is the ratio of the polymer formed from the starting monomer to the reaction liquid at the exit of the first reactor by weight percent.

2. A process according to claim 1 in which the particle disperser has at least three shearing rotors, each having paddles or at least one cylindrical ring on a rotatable shaft capable of rotating at a high speed, therein, and said shearing rotors are arranged in a chamber with a baffle or stator equipped between the respective two shearing rotors adjacent each other or are arranged respectively in the different chambers disposed in a series arrangement relative to the flowing direction of the reaction liquid to be treated in said particle disperser.

3. A process according to claim 1, in which said shearing stirrer in the particle disperser comprises at least three combinations each composed of a cylindrical rotor and stator coaxially arranged each other with a gap between the rotor and stator, and in which the shearing stirrer is operated under condition of satisfying the following formula of $$v/h \geq 200,$$

wherein h is the length of said gap by meter between a rotor and stator adjacent each other and v is said peripheral linear velocity of the rotor being rotated by meter per second.

4. A process according to claim 1, in which said reaction liquid taken out of the first reactor is fed into a circulation line including the particle disperser for subjecting said liquid to the shearing treatment, the particles in said reaction liquid is treated by the shearing stirrer in the particle disperser while forcibly circulating said reaction liquid through said circulation line by a pump, and the circulation of said reaction liquid is conducted under condition of satisfying the following formula of $$1.5 < F_2/F_1 < 30$$

wherein $F_1$ is the volume of the starting solution supplied into the first reactor in the period of unit time and $F_2$ is the volume of said reaction liquid circulated through the circulation line in the period of the same unit time.

5. A process according to claim 3, in which said starting solution consisting of a rubbery polymer, having a viscosity of 100 centipoise or lower in its styrene solution of 5% by weight at 25° C., and starting monomers containing an aromatic vinyl monomer and a vinyl cyanide monomer at a ratio of the aromatic vinyl monomer to the vinyl cyanide monomer in the range of from 95/5 to 50/50 by weight, is supplied into the first reactor together with a radical polymerization initiator, having a decomposition temperature of 100° C. or lower corresponding to the half-life period of ten hours, in an amount of 30 ppm by weight or more relative to the amount of the starting solution to be supplied into the first reactor so as to satisfy the following formulas of $$1 < X_1 \leq 15$$

and $$2.0\, X_1 - 0.05\, X^2_1 < X_2 < 4.0\, X_1 - 0.05\, X^2_1$$

wherein $X_1$ is the proportion of the rubbery polymer in the reaction liquid at the exit of the first reactor by weight percent and $X_2$ is the ratio of the polymer formed from the starting monomer to the reaction liquid at the exit of the first reactor by weight percent.

6. A process according to claim 1, in which said starting solution consisting of a rubbery polymer, having a viscosity of 100 centipose or lower in its styrene solution of 5% by weight at 25° C., and starting monomers containing an aromatic vinyl monomer and a vinyl cyanide monomer at a ratio of the aromatic vinyl monomer to the vinyl cyanide monomer in the range of from 95/5 to 50/50 by weight, is supplied into the first reactor together with a radical polymerization initiator, having a decomposition temperature of 100° C. or lower corresponding to the half-life period of ten hours, in an amount of 30 ppm by weight or more relative to the amount of the starting solution to be supplied into the first reactor so as to satisfy the following formulas of $$1 < X_1 \leq 15$$

and $$2.0\, X_1 - 0.05\, X^2_1 < X_2 < 4.0\, X_1 - 0.05\, X^2_1$$

wherein $X_1$ is the proportion of the rubbery polymer in the reaction liquid at the exit of the first reactor by weight percent and $X_2$ is the ratio of the polymer formed from the starting monomer to the reaction liquid at the exit of the first reactor by weight percent.

7. A process according to claim 2, in which said starting solution consisting of a rubbery polymer, having a viscosity of 100 centipose or lower in its styrene solution of 5% by weight at 25° C., and starting monomers containing an aromatic vinyl monomer and a vinyl cyanide monomer at a ratio of the aromatic vinyl monomer to the vinyl cyanide monomer in the range of from 95/5 to 50/50 by weight, is supplied into the first reactor together with a radical polymerization initiator, having a decomposition temperature of 100° C. or lower corresponding to the half-life period of ten hours, in an amount of 30 ppm by weight or more relative to the amount of the starting solution to be supplied into the first reactor so as to satisfy the following formulas of $$1 < X_1 \leq 15$$

and $$2.0\, X_1 - 0.05\, X^2_1 < X_2 < 4.0\, X_1 - 0.05^2_1$$

wherein $X_1$ is the proportion of the rubbery polymer in the reaction liquid at the exit of the first reactor by weight percent and $X_2$ is the ratio of the polymer formed from the starting monomer to the reaction liquid at the exit of the fist reactor by weight percent.

* * * * *

UNITED STATES PATENT AND TRADEMARK OFFICE
CERTIFICATE OF CORRECTION

PATENT NO. : 5,210,132

DATED : May 11, 1993

INVENTOR(S) : Matsubara et al.

It is certified that error appears in the above-identified patent and that said Letters Patent is hereby corrected as shown below:

Column 40, line 44, delete "$-0.05^2_1$" and insert therefor ---$0.05\ x^2_1$--.

Column 40, line 49, delete "fist" and insert therefor --first--.

Signed and Sealed this

Twenty-sixth Day of July, 1994

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,210,132
DATED : May 11, 1993
INVENTOR(S) : Tetsuyuki Matsubara, et al It is certified that error appears in the above-indentified patent and that said Letters Patent is hereby corrected as shown below:

Column 40, line 1, delete "centipose" and insert --centipoise--.

Column 40, line 27, delete "centipose" and insert --centipoise--.

Signed and Sealed this

Twentieth Day of December, 1994

Attest:

BRUCE LEHMAN

Attesting Officer     Commissioner of Patents and Trademarks